(12) United States Patent
Kang

(10) Patent No.: US 11,999,343 B2
(45) Date of Patent: Jun. 4, 2024

(54) APPARATUS FOR CONTROLLING PARKING OF A VEHICLE AND PARKING CONTROL METHOD

(71) Applicants: Hyundai Motor Company, Seoul (KR); Kia Corporation, Seoul (KR)

(72) Inventor: Min Chul Kang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 297 days.

(21) Appl. No.: 17/505,150

(22) Filed: Oct. 19, 2021

(65) Prior Publication Data

US 2022/0324436 A1 Oct. 13, 2022

(30) Foreign Application Priority Data

Apr. 12, 2021 (KR) ........................ 10-2021-0047222

(51) Int. Cl.
  *B60W 30/06* (2006.01)
  *B60W 50/14* (2020.01)
  *G08G 1/14* (2006.01)
  *G08G 1/16* (2006.01)

(52) U.S. Cl.
  CPC ............ *B60W 30/06* (2013.01); *B60W 50/14* (2013.01); *G08G 1/145* (2013.01); *G08G 1/16* (2013.01); *B60W 2050/143* (2013.01); *B60W 2540/215* (2020.02); *B60W 2552/00* (2020.02); *B60W 2554/406* (2020.02); *B60W 2710/06* (2013.01); *B60W 2710/18* (2013.01); *B60W 2710/20* (2013.01)

(58) Field of Classification Search
  CPC ....................................................... B60W 30/06
  See application file for complete search history.

(56) References Cited

U.S. PATENT DOCUMENTS

| | | | | |
|---|---|---|---|---|
| 2016/0075328 | A1* | 3/2016 | Kiyokawa | B60W 30/06 701/41 |
| 2016/0284217 | A1* | 9/2016 | Lee | B60D 1/30 |
| 2016/0371607 | A1* | 12/2016 | Rosen | G08G 1/141 |
| 2017/0018183 | A1* | 1/2017 | Rosen | G06Q 10/02 |
| 2018/0099661 | A1* | 4/2018 | Bae | B62D 15/0285 |
| 2018/0304885 | A1* | 10/2018 | Kang | B60W 10/20 |
| 2019/0217856 | A1* | 7/2019 | Inoue | G06V 20/58 |
| 2020/0269832 | A1* | 8/2020 | Kwon | B60W 30/06 |

* cited by examiner

*Primary Examiner* — Jelani A Smith
*Assistant Examiner* — Samantha P. Pelow
(74) *Attorney, Agent, or Firm* — Fox Rothschild LLP

(57) ABSTRACT

A parking control apparatus includes: a processor configured to generate an outline based on previously parked vehicles, to generate a target reference based on the outline, to select a parking spot for double-parking based on the target reference, and to perform double-parking control on the parking spot when there are no vacant parking spaces by searching for at least a parking space in a parking lot; and a storage configured to store data and algorithms driven by the processor.

19 Claims, 39 Drawing Sheets

Parallel parking

APPARATUS FOR CONTROLLING PARKING OF A VEHICLE AND PARKING CONTROL METHOD

CROSS-REFERENCE TO RELATED APPLICATION

This application claims under 35 U.S.C. § 119(a) the benefit of Korean Patent Application No. 10-2021-0047222, filed in the Korean Intellectual Property Office on Apr. 12, 2021, the entire contents of which are incorporated herein by reference.

BACKGROUND

(a) Technical Field

The present disclosure relates to a parking control apparatus for a vehicle and a parking control method, more particularly, to a technique for automatically performing double-parking control.

(b) Description of the Related Art

Recently, as demand for vehicle performance as well as demand for safety and convenience of a vehicle increases, a driver assist system (DAS) that assists in controlling the vehicle based on information obtained through sensors and the like mounted in the vehicle has been researched, developed, and applied to the vehicle.

In particular, an automatic parking technique is a convenience function with high user acceptance, and is becoming more common in vehicles. The conventional parking control system is limited in controlling parking or exit to a predetermined parking space, such as parallel parking, perpendicular parking, and perpendicular exit.

However, in a situation where the parking space is insufficient, double-parking may be required, but the conventional parking control system does not support double-parking control.

The above information disclosed in this Background section is only for enhancement of understanding of the background of the disclosure, and therefore, it may contain information that does not form the prior art that is already known in this country to a person of ordinary skill in the art.

SUMMARY

An exemplary embodiment of the present disclosure provides a parking control apparatus for a vehicle and a parking control method, which may provide user convenience by supporting double-parking control during automatic parking control.

The technical objects of the present disclosure are not limited to the objects mentioned above, and other technical objects not mentioned can be clearly understood by those skilled in the art from the description of the claims.

An exemplary embodiment of the present disclosure provides a parking control apparatus including: a processor configured to generate an outline based on previously parked vehicles, to generate a target reference based on the outline, to select a parking spot for double-parking based on the target reference, and to perform double-parking control on the parking spot when there are no vacant parking spaces by searching for at least a parking space in a parking lot; and a storage configured to store data and algorithms driven by the processor.

In an exemplary embodiment, the processor may generate the target reference between the double-parking guide line and the outline, and may generate the target reference parallel to the double-parking guide line when a double-parking guide line is detected in searching for the parking space.

In an exemplary embodiment, the processor may generate a target reference to be parallel to a parking dividing line in a longitudinal direction by separating it by a predetermined distance from a point that is closest to a driving passage in the outline when no double-parking guide line is detected in searching for the parking space.

In an exemplary embodiment, the processor may generate a parking zone by using at least one of a size of a double-parking place, a traffic situation, or a traffic lane width after parking.

In an exemplary embodiment, the processor may divide the parking zone into a general mode in which an entire size of the double-parking place is set as the parking zone and a specific mode in which a portion of the double-parking place is set as the parking zone.

In an exemplary embodiment, the processor induces the general mode to be set when the size of the double-parking place is larger than a predetermined size, a number of vehicles passing is smaller than a predetermined number, or the traffic lane width is wide after parking.

In an exemplary embodiment, the processor may control a host vehicle to be double-parked at a side of an aisle in which other vehicles travel based on the target reference in the general mode.

In an exemplary embodiment, the processor may induce the general mode to be set when the size of the double-parking place is smaller than a predetermined size, a number of vehicles passing is greater than a predetermined number, or the traffic lane width is narrow after parking.

In an exemplary embodiment, may double-park based on the target reference, and may control a vehicle to double-park between the target reference and the outline in the specific mode.

In an exemplary embodiment, the processor may suggest one of the general mode and the specific mode to a user, and allow the user to select one of the modes by using at least one of a size of a double-parking place, a traffic situation, or a traffic lane width after parking.

In an exemplary embodiment, the processor may control the vehicle to be double-parked in an innermost side of the parking zone based on a movement direction of the host vehicle when there is no already double-parked vehicle in the parking zone.

In an exemplary embodiment, the processor, when there are already double-parked vehicles in the parking zone, may search for available parking spaces between the previously double-parked vehicles, and may select a large-sized parking space among the available parking spaces as the parking spot.

In an exemplary embodiment, the processor, when double-parking in the parking zone, may select the parking spot in a center of the parking zone in consideration of a space capable of moving forward or backward to control double-parking.

In an exemplary embodiment, the processor may generate a parking trajectory for parking a host vehicle at the parking spot, may control the host vehicle depending on the parking trajectory, and may output an alarm command after completion of double-parking at the parking spot.

In an exemplary embodiment, the processor may determine a possibility of collision when moving it forward or backward after completing double-parking at the parking spot.

In an exemplary embodiment, the processor, when there is a possibility of collision, may correct a position by moving the host vehicle in the longitudinal or lateral direction at the parking spot to avoid the collision.

In an exemplary embodiment, the processor, after correction of the position, may output a final alarm command informing that the double-parking has been completed.

In an exemplary embodiment, the processor, when performing the double-parking control of a host vehicle at the parking spot, may perform double-parking control based on one of a semi-automatic mode or a fully automatic mode selected by a user.

An exemplary embodiment of the present disclosure provides a parking control method including: searching for a parking space in a parking lot; generating an outline based on previously parked vehicles when there is no free parking space; generating a target reference based on the outline; selecting a parking spot for double-parking based on the target reference; and performing double-parking control on the parking spot.

In an exemplary embodiment, the generating of the target reference may include: generating the target reference between the double-parking guide line and the outline, and generating the target reference parallel to the double-parking guide line when a double-parking guide line is detected in searching for the parking space; and generating a target reference to be parallel to a parking dividing line in a longitudinal direction by separating it by a predetermined distance from a point that is closest to a driving passage in the outline when no double-parking guide line is detected in searching for the parking space.

According to the present technique, it is possible to increase user convenience by supporting double-parking control during automatic parking control.

In addition, various effects that can be directly or indirectly identified through this document may be provided.

DETAILED DESCRIPTION OF THE EMBODIMENTS

Figure 1:
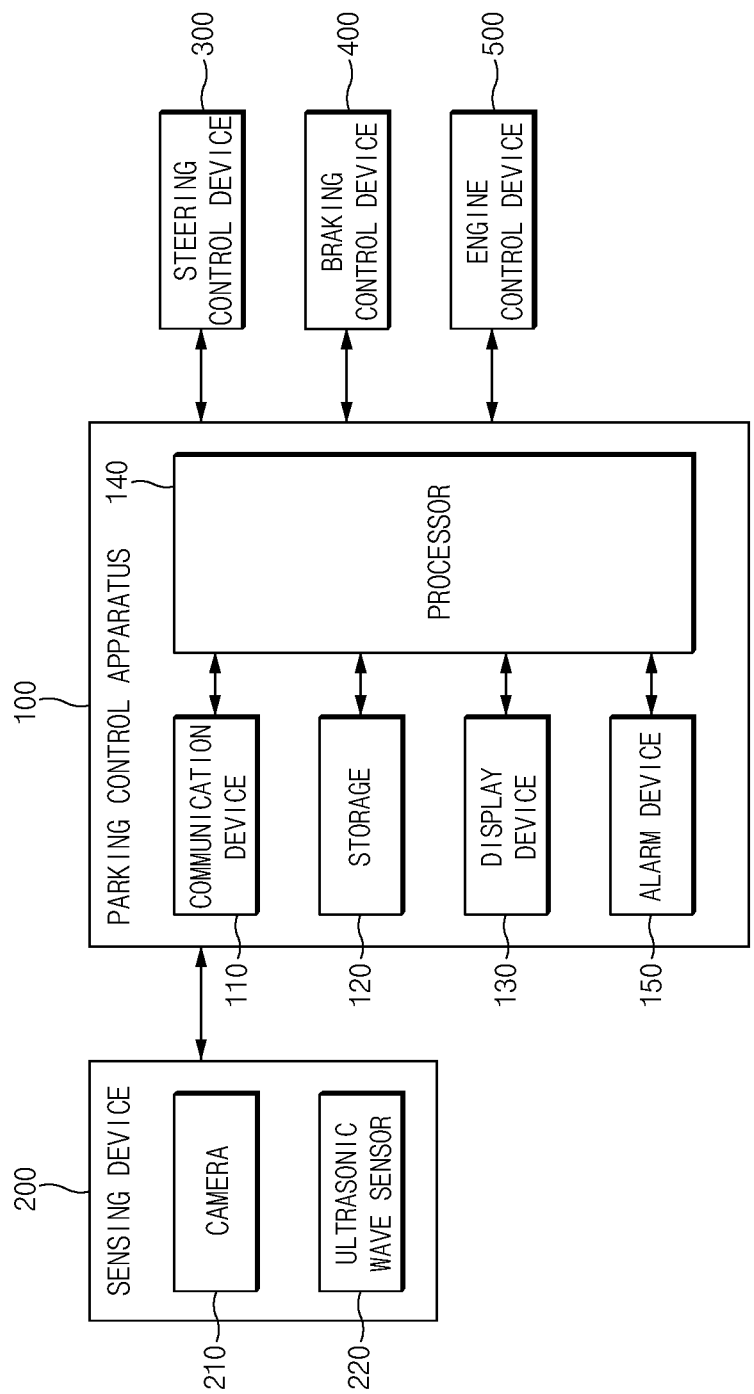
FIG. 1 illustrates a block diagram showing a configuration of a vehicle system including a parking control apparatus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIGS. 1 to 13.

Figure 2:
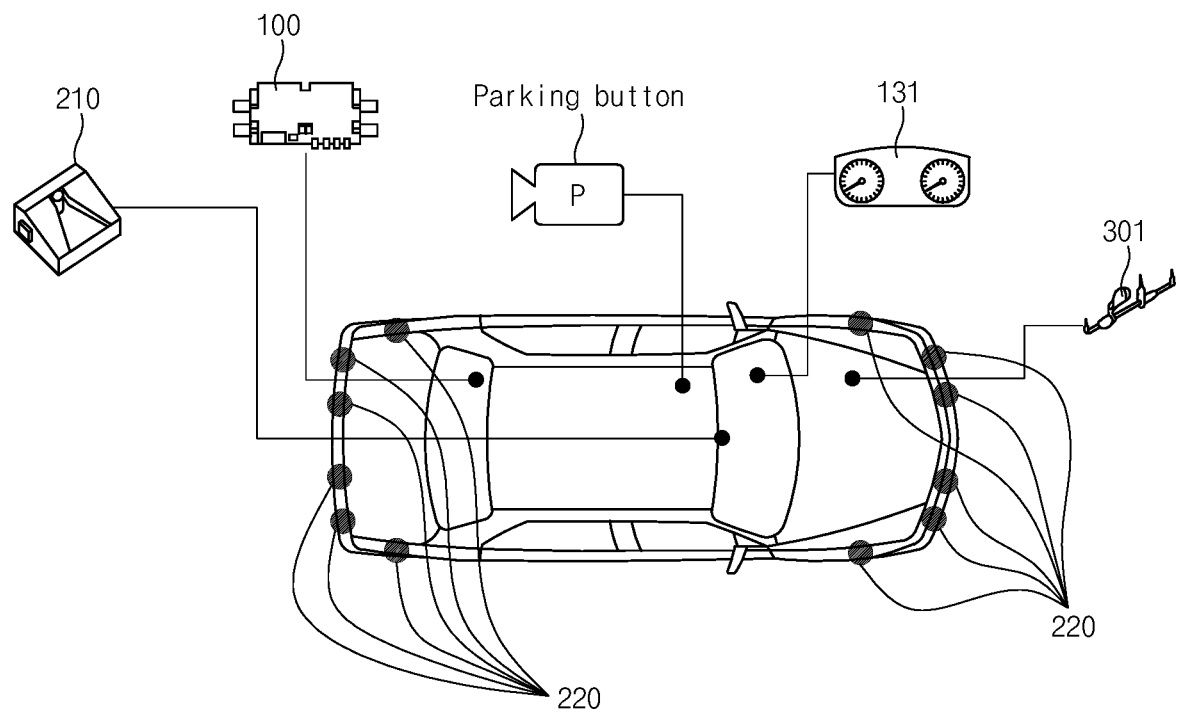
FIG. 2 illustrates an example of a screen to which a parking control apparatus is applied to a vehicle according to an exemplary embodiment of the present disclosure.

FIG. 1 illustrates a block diagram showing a configuration of a vehicle system including a parking control apparatus according to an exemplary embodiment of the present disclosure, and FIG. 2 illustrates an example of a screen to which a parking control apparatus is applied to a vehicle according to an exemplary embodiment of the present disclosure.

Referring to FIG. 1, the vehicle system according to the exemplary embodiment of the present disclosure may include a parking control apparatus 100, a sensing device 200, a steering control device 300, a braking control device 400, and an engine control device 500.

The parking control apparatus 100 according to the exemplary embodiment of the present disclosure may be implemented inside the vehicle. In this case, the parking control apparatus 100 may be integrally formed with internal control units of the vehicle, or may be implemented as a separate device to be connected to control units of the vehicle by a separate connection device.

The parking control apparatus 100 may include a remote smart parking assist (RSPA) system, a smart parking assistant system (SPAS), and the like. The parking control apparatus 100 starts parking control when a parking button, as shown in FIG. 2, is pressed.

When there are no vacant parking spaces by searching for at least a parking space in a parking lot, the parking control apparatus 100 may generate an outline based on previously parked vehicles, may generate a target reference based on the outline, may select a parking spot for double-parking based on the target reference (target baseline), and may perform double-parking control on the parking spot.

Referring to FIG. 1, the parking control apparatus 100 may include a communication device 110, a storage 120, a display device 130, a processor 140, and an alarm device 150.

The communication device 110 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

In addition, the communication device 110 may perform communication by using a server, infrastructure, or third vehicles outside the vehicle, and the like through a wireless Internet access or short range communication technique. Herein, the wireless communication technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like. For example, the communication device 110 may remotely perform wireless communication during parking control. In addition, the communication device 110 may share parking lot information by performing communication with a parking lot server.

The storage 120 may store sensing results of the sensing device 200 and data and/or algorithms required for the processor 140 to operate, and the like.

For example, the storage 120 may store a parking space search result. In addition, the storage 120 may store information related to an obstacle, e.g., a previously parked vehicle sensed by the sensing device 200.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The display device 130 may include an input means for receiving a control command from a user and an output means for outputting an operation state of the apparatus 100 and results thereof. Herein, the input means may include a key button, and may include a mouse, a joystick, a jog shuttle, a stylus pen, and the like. In addition, the input means may include a soft key implemented on the display.

The interface device 130 may be implemented as a head-up display (HUD), a cluster, an audio video navigation (AVN), a human machine interface (HM), a user select menu (USM). In FIG. 1, the display device 130 is configured as an example included in the parking control apparatus 100, but as illustrated in FIG. 2, it may be implemented as a cluster 131 or the like which is a hardware device that is separate from the parking control apparatus 100.

Figure 11A:
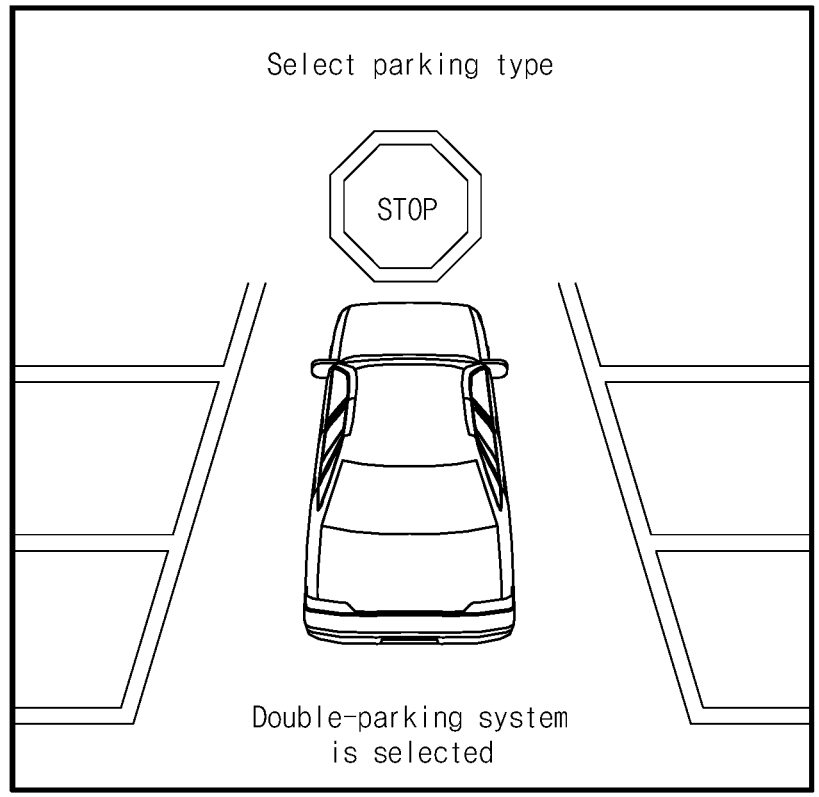
FIGS. 11A to 11N illustrate an example of a screen for each operation during parking control according to an exemplary embodiment of the present disclosure.

The output device may include a display, and may also include a voice output means such as a speaker. In this case, when a touch sensor formed of a touch film, a touch sheet, or a touch pad is provided on the display, the display may operate as a touch screen, and may be implemented in a form in which an input device and an output device are integrated. In the present disclosure, the output means may output a screen indicating a control situation during double-parking control as illustrated in FIGS. 11A to 11N, which will be described later.

In this case, the display may include at least one of a liquid crystal display (LCD), a thin film transistor liquid crystal display (TFT LCD), an organic light emitting diode display (OLED display), a flexible display, a field emission display (FED), or a 3D display.

The processor 140 may be electrically connected to the communication device 110, the storage 120, the display device 130, an alarm device 150, and the like, may electrically control each component, and may be an electrical circuit that executes software commands, thereby performing various data processing and calculations described below.

The processor 140 may process a signal transferred between components of the parking control apparatus 100, and may perform overall control such that each of the components can perform its function normally.

The processor 140 may be implemented in the form of hardware, software, or a combination of hardware and software, or may be implemented as microprocessor, and may be, e.g., an electronic control unit (ECU), a micro controller unit (MCU), or other subcontrollers mounted in the vehicle.

When there are no vacant parking spaces by searching for at least a parking space in a parking lot, the processor 140 may generate an outline based on previously parked vehicles, may generate a target reference based on the outline, may select a parking spot for double-parking based on the target reference, and may perform double-parking control on the parking spot.

Figure 3A:
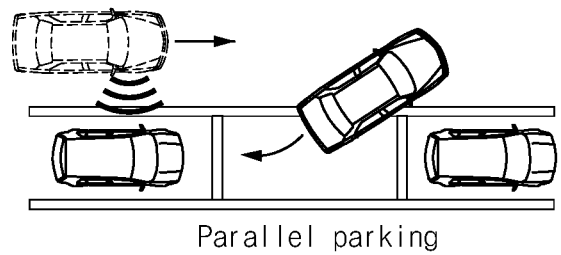
FIGS. 3A to 3D illustrate an example of a screen for a parking support mode of a parking control apparatus according to an exemplary embodiment of the present disclosure.
Figure 3B:
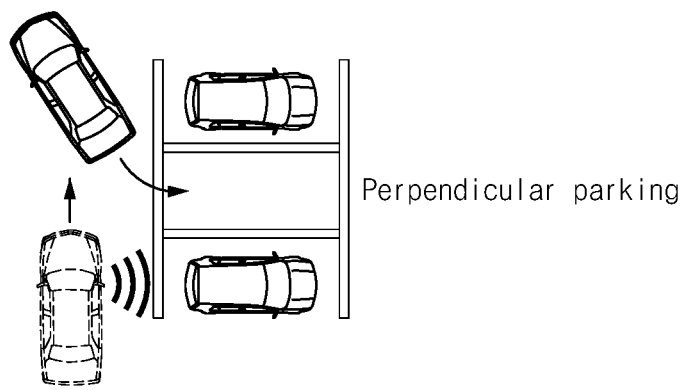
Figure 3C:
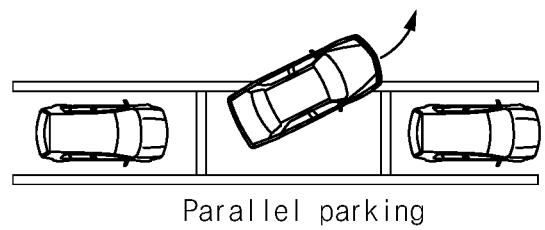
Figure 3D:
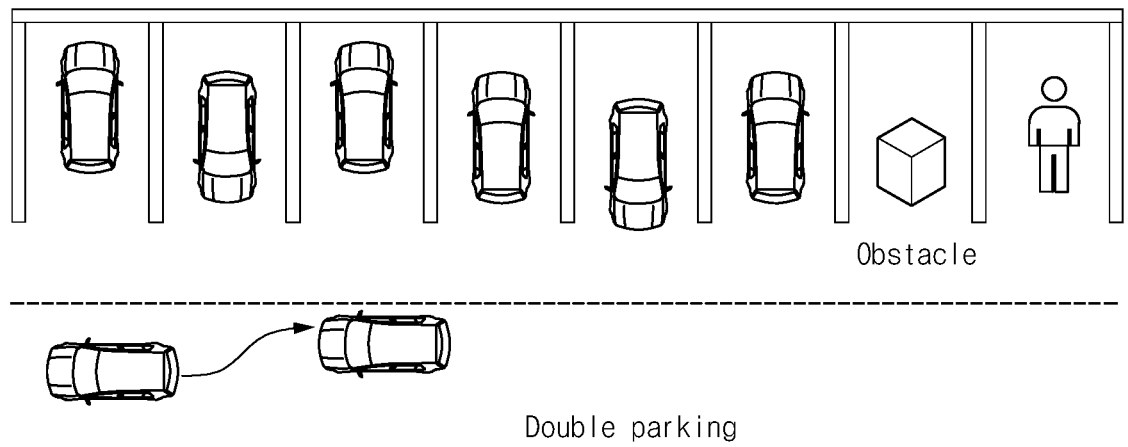

The processor 140 may support parallel parking as illustrated in FIG. 3A, perpendicular parking as illustrated in FIG. 3B, parallel parking as illustrated in FIG. 3C, and double-parking control as illustrated in FIG. 3D. FIGS. 3A to 3D illustrate an example of a screen for a parking support mode of a parking control apparatus according to an exemplary embodiment of the present disclosure.

In the case where a double-parking guide line is detected when searching for a parking space, the processor 140 may generate a target reference between the double-parking guide line and an outline, to be parallel to the double-parking guide line.

FIGS. 4A to 4D illustrate views for describing a double-parking control process when double-parking guidelines exist according to an exemplary embodiment of the present disclosure.

Figure 4A:
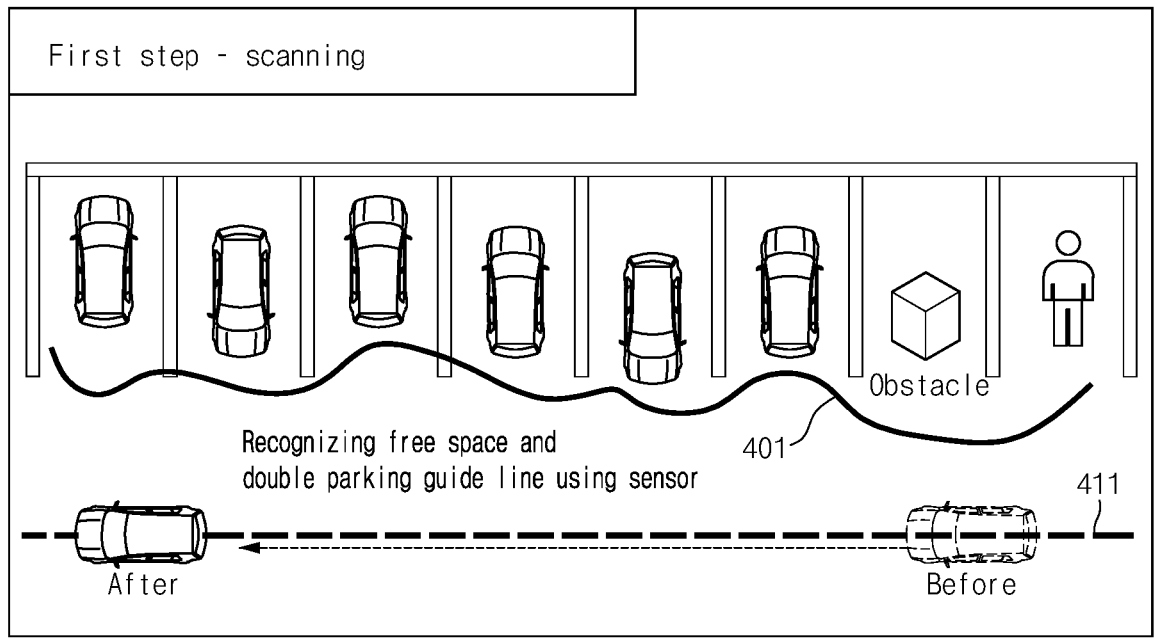
FIGS. 4A to 4D illustrate views for describing a double-parking control process when double-parking guidelines exist according to an exemplary embodiment of the present disclosure.

Referring to FIG. 4A, the processor 140 generates an outline 401 by searching for a parking space, and recognizes the previously generated double-parking guide line 411.

Figure 4B:
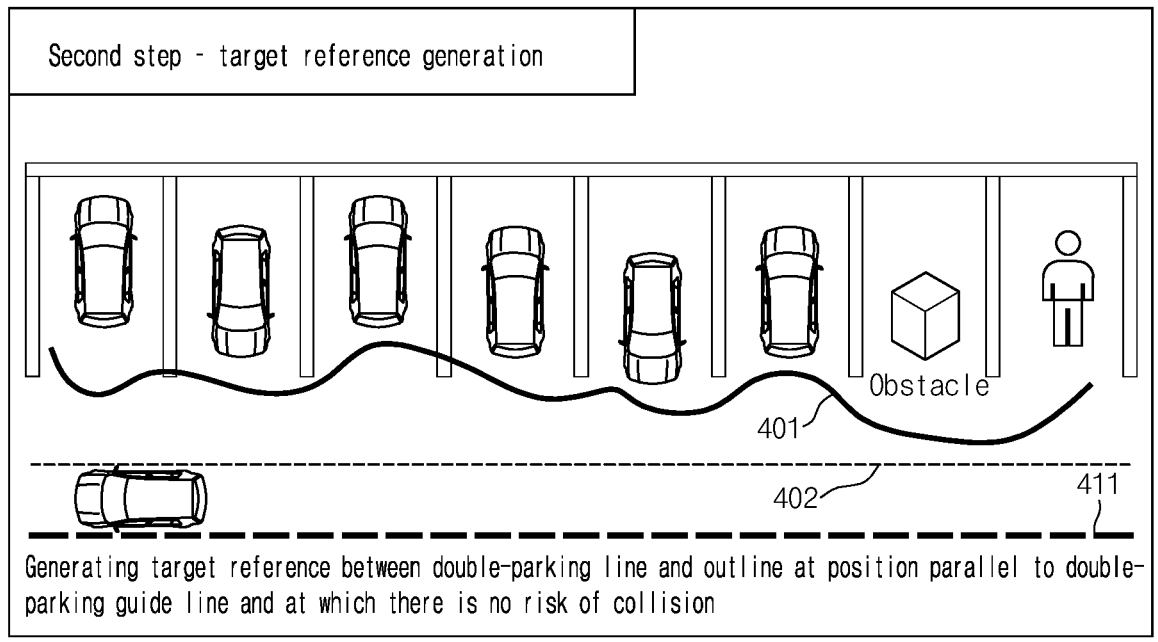

Referring to FIG. 4B, the processor 140 generates a target reference 402 based on the double-parking guide line 411 and the outline 401. That is, the processor 140 may generate a target reference 402 between the double-parking guide line 411 and the outline 401, at a position that is parallel to the double-parking guide line 411 and at which there is no risk of collision.

Figure 4C:
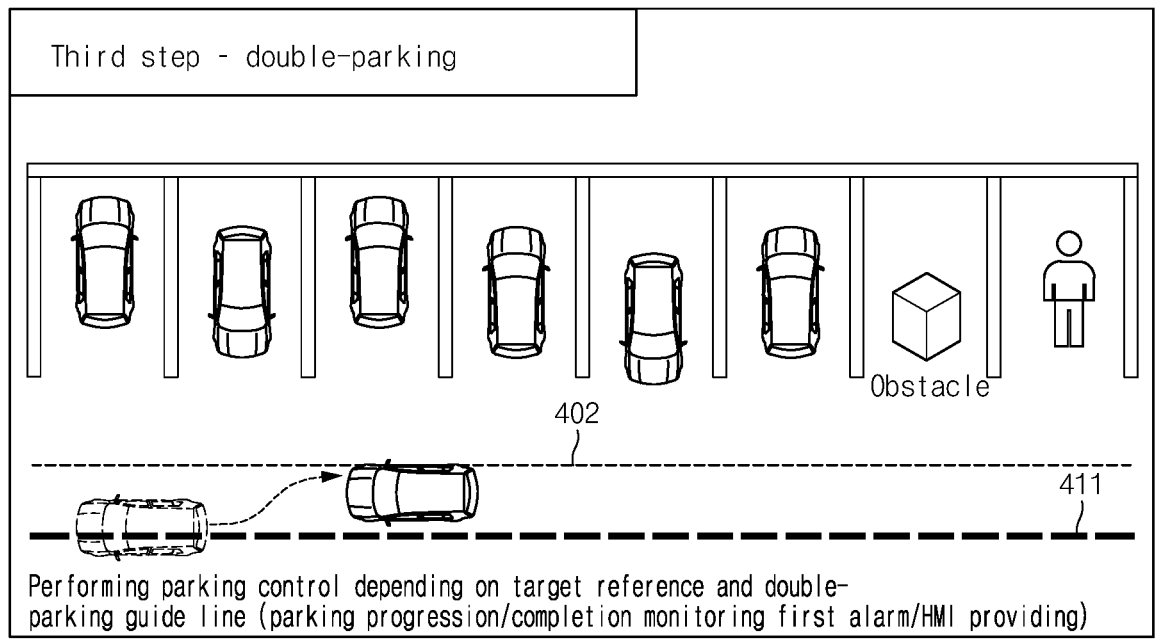

Referring to FIG. 4C, the processor 140 performs parking control depending on the target reference 402 and the double-parking guide line 411 by a manual or a parking control function, and performs a first alarm after parking is completed.

Figure 4D:
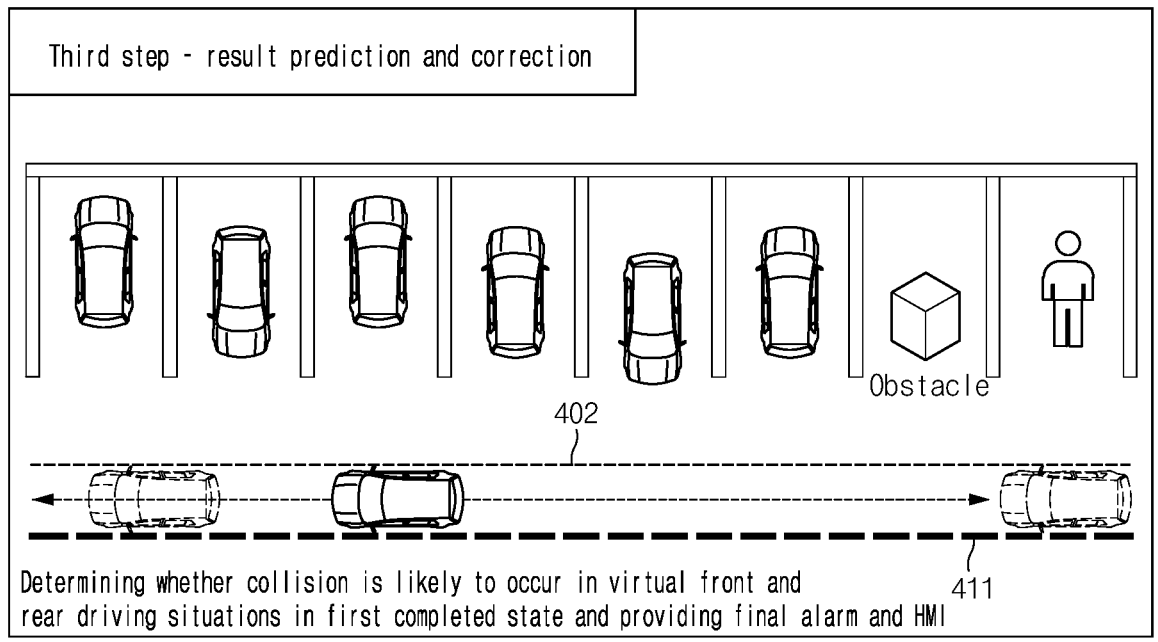

Referring to FIG. 4D, the processor 140 determines whether a collision is likely to occur in virtual front and rear driving situations in a first completed state, and when there is a possibility of a collision, may correct a current position of the host vehicle and output a final double-parking completion alarm.

In the case where the double-parking guide line is not detected when searching for a parking space, the processor 140 may generate a target reference to be parallel to a parking dividing line in a longitudinal direction by separating it by a predetermined distance from a point that is closest to a driving passage in the outline.

FIGS. 5A to 5D illustrate views for describing a double-parking control process when no double-parking guidelines exist according to an exemplary embodiment of the present disclosure.

Figure 5A:
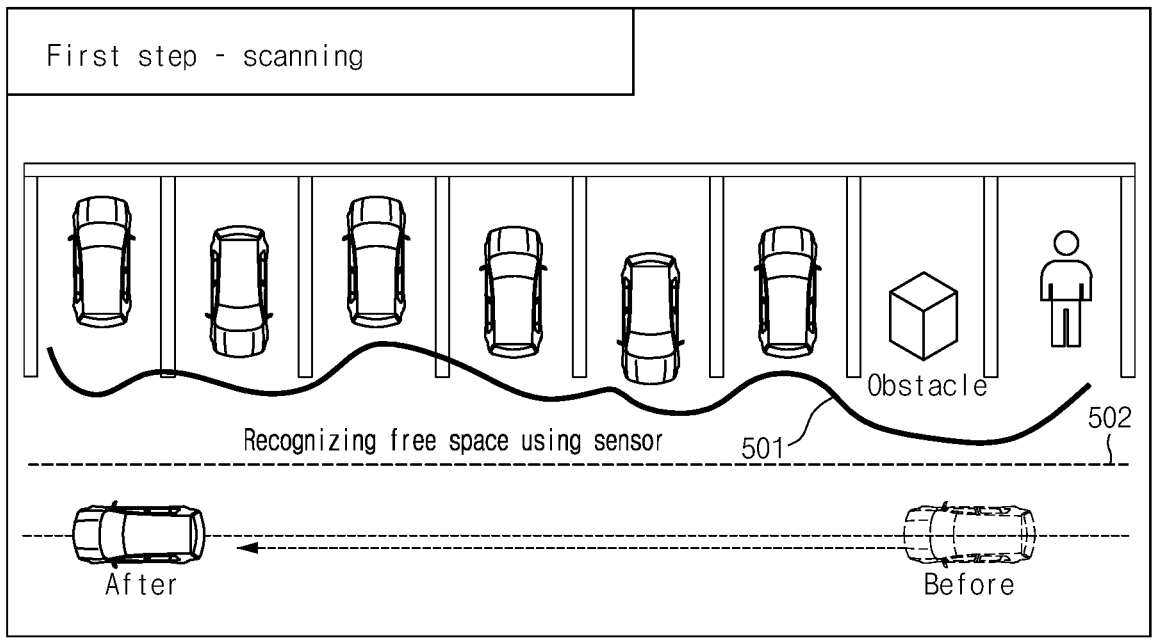
FIGS. 5A to 5D illustrate views for describing a double-parking control process when no double-parking guidelines exist according to an exemplary embodiment of the present disclosure.

Referring to FIG. 5A, the processor 140 generates an outline 501 by searching for a parking space.

Figure 5B:
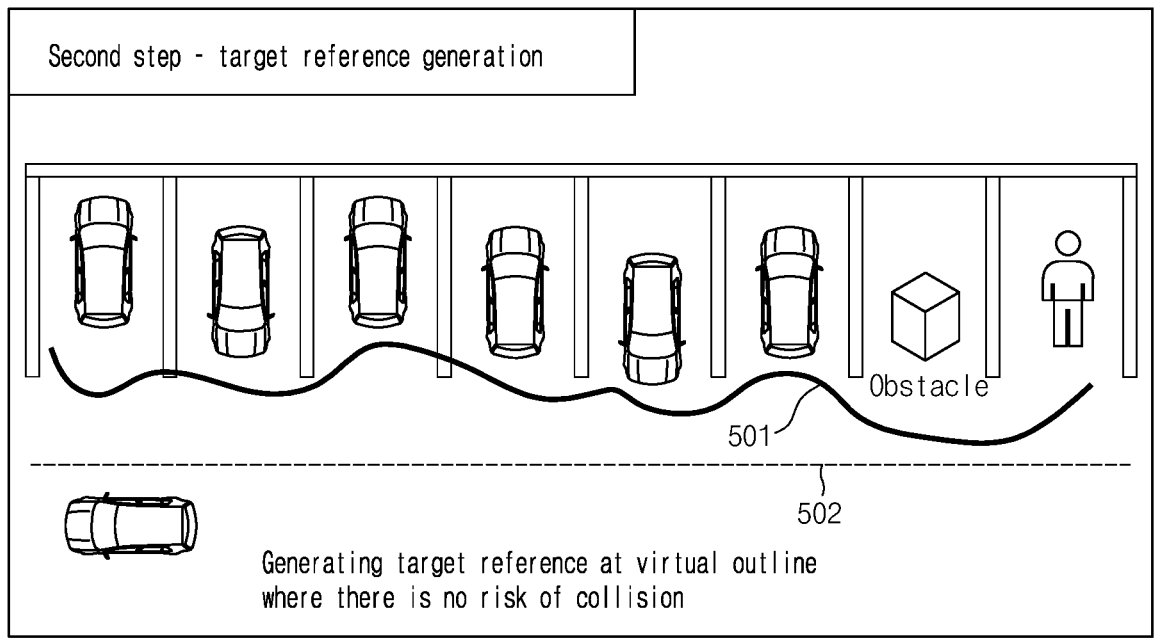

Referring to FIG. 5B, the processor 140 generates a target reference 502 based on the outline 501. That is, the processor 140 may generate the target reference 502 by drawing a line segment from a current position of a host vehicle within a predetermined distance from the outline 501 to an end point of a parking lot, at a position where there is no risk of collision.

Figure 5C:
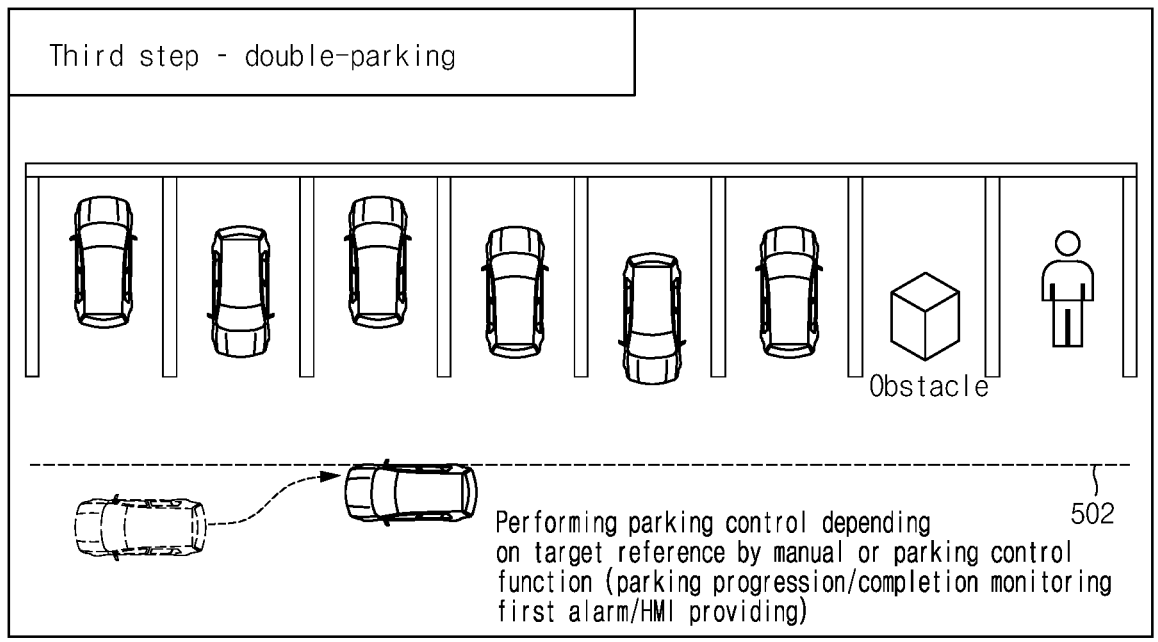

Referring to FIG. 5C, the processor 140 performs parking control depending on the target reference 502 by a manual or a parking control function, and performs a first alarm after parking is completed.

Figure 5D:
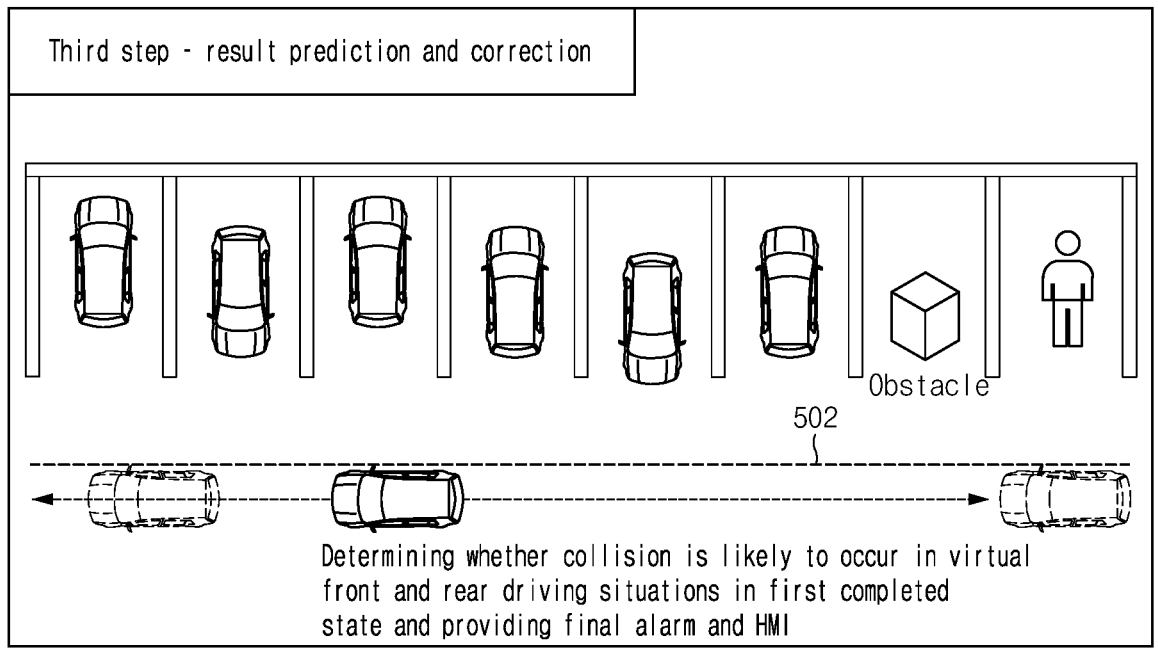

Referring to FIG. 5D, the processor 140 determines whether a collision is likely to occur in virtual front and rear driving situations in a first completed state, and when there is a possibility of a collision, may correct a current position of the host vehicle and output a final double-parking completion alarm.

Figure 6A:
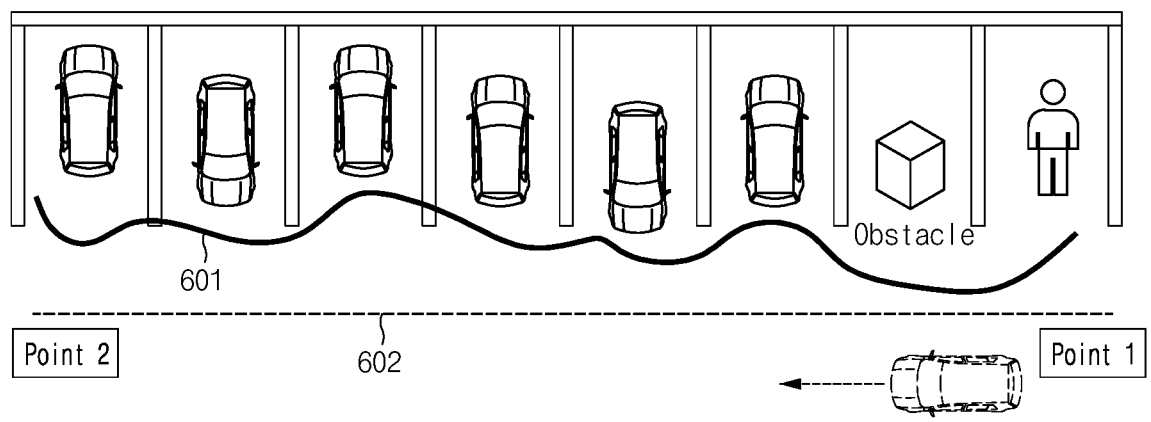
FIGS. 6A and 6B illustrate views for describing a process of setting an outline according to an exemplary embodiment of the present disclosure.
Figure 6B:
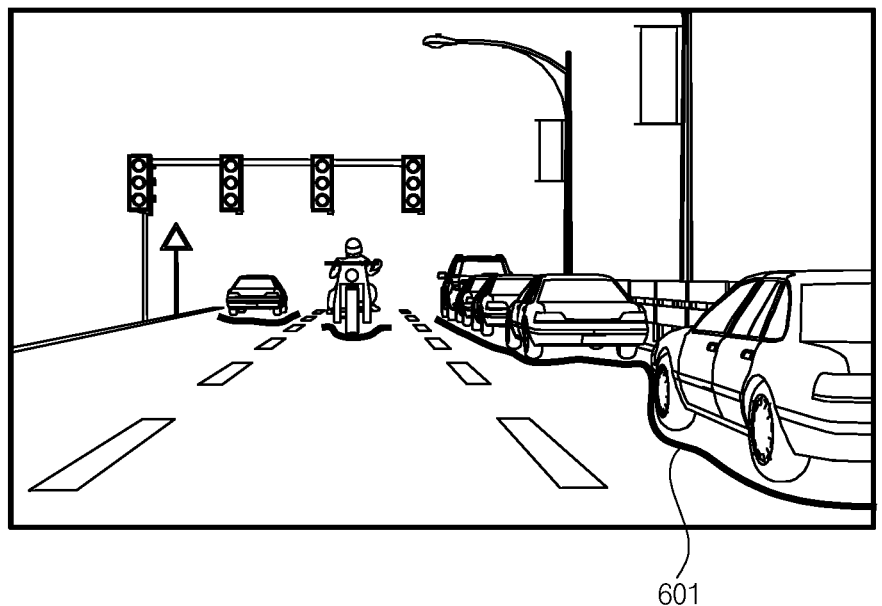

FIGS. 6A and 6B illustrate views for describing a process of setting an outline according to an exemplary embodiment of the present disclosure. Referring to FIG. 6A, when there is no free parking space in the parking lot, the processor 140 generates an outline 601 based on a vehicle that is previously parked from point 1 to point 2, and generates a spaced target reference (target baseline) 602 that is spaced apart from the outline 601 by a predetermined distance. FIG. 6B is an example of a screen in which the outline 601 is actually detected.

The processor 140 may generate a parking zone by using at least one of a size of a double-parking place, a traffic situation, or a traffic lane width after parking.

The processor 140 may divide the parking zone into a general mode in which an entire size of the double-parking place is set as the parking zone and a specific mode in which a portion of the double-parking place is set as the parking zone.

The processor 140 may induce the general mode to be set when the size of the double-parking place is larger than a predetermined size, a number of vehicles passing is smaller than a predetermined number, or the traffic lane width is wide after parking.

In the general mode, the processor 140 may control the host vehicle to be double-parked at a side of an aisle in which other vehicles travel based on a target reference.

The processor 140 may induce the general mode to be set when the size of the double-parking place is smaller than a predetermined size, a number of vehicles passing is greater than a predetermined number, or the traffic lane width is narrow after parking.

In the specific mode, the processor 140 may control double-parking based on the target reference, but may control a vehicle to double-park between the target reference and the outline.

The processor 140 may suggest one of the general mode and the specific mode to a user, and allow the user to select one of the modes by using at least one of a size of a double-parking place, a traffic situation, or a traffic lane width after parking.

Figure 7A:
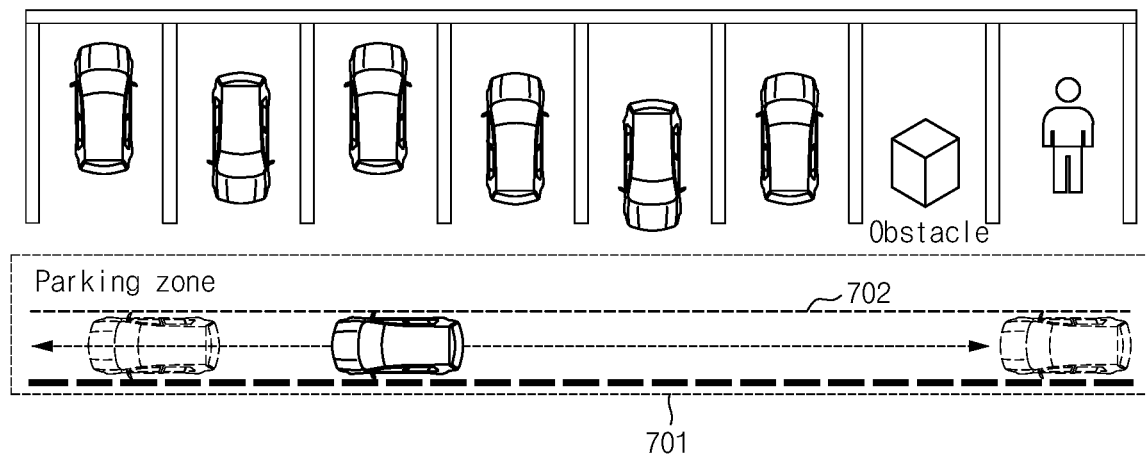
FIGS. 7A and 7B illustrate views for describing a process of a double-parking zone according to an exemplary embodiment of the present disclosure.
Figure 7B:
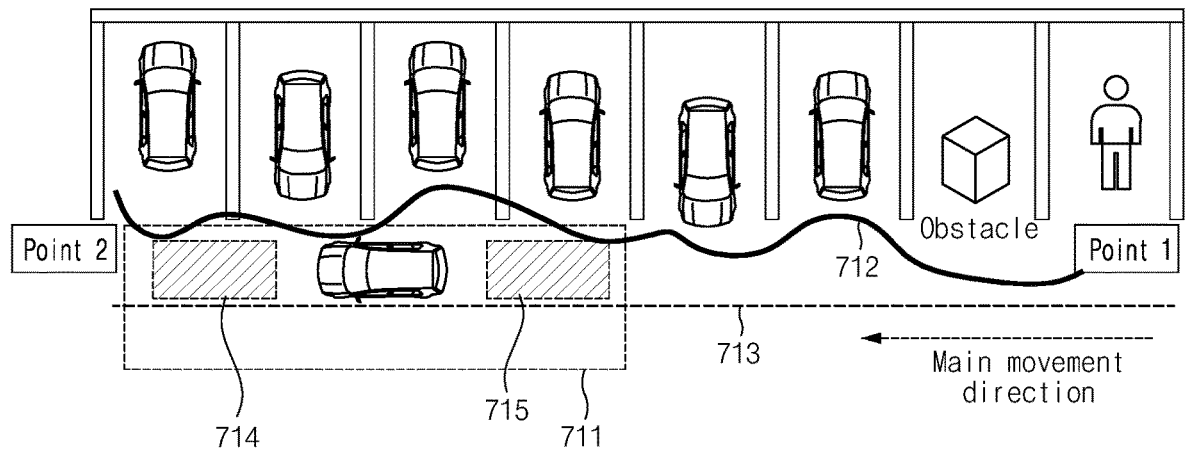

FIGS. 7A and 7B illustrate views for describing a process of a double-parking zone according to an exemplary embodiment of the present disclosure.

Referring to FIG. 7A, an example in which the general mode is selected by a user after the processor 140 generates a target reference 702, and a parking zone 701 is set as an entire zone from point 1 to point 2 is disclosed.

Referring to FIG. 7B, an example in which the specific mode is selected by a user after the processor 140 generates a target reference 713 based on an outline 712, and a parking zone 711 is set as a partial zone from point 1 to point 2 is disclosed. Two parking spots 714 and 715 are provided in the parking zone 711.

The processor 140 may divide the parking zone into the general mode and the specific mode when generating the target reference.

In the normal mode, after the outline is generated as illustrated in FIG. 6A, the entire zone from point 1 to point 2 is set as the parking zone 701 as illustrated in FIG. 7A.

The specific mode indicates a situation in which parking is limited to vicinity of point 1 or point 2 as illustrated in FIG. 7B, and only a specific zone, not the entire zone, is set as the parking zone.

In the case of the general mode, it is convenient by keeping a sufficient distance to an existing parking space, but it takes up a lot of space, while in the case of the specific mode, parking is performed in a driving space of vehicles to set a minimum or optimal space, so park as close to an existing parked vehicle as possible, but after parking, there must be a certain amount of space in the front and rear so that the previously parked vehicle may exit by moving forward and backward.

Accordingly, the parking control apparatus 100 informs the user of the general mode and the specific mode so that the user can select it.

The processor 140 may control the vehicle to be double-parked in an innermost side of the parking zone based on a movement direction of the host vehicle when there is no previously double-parked vehicle in the parking zone.

Figure 8A:
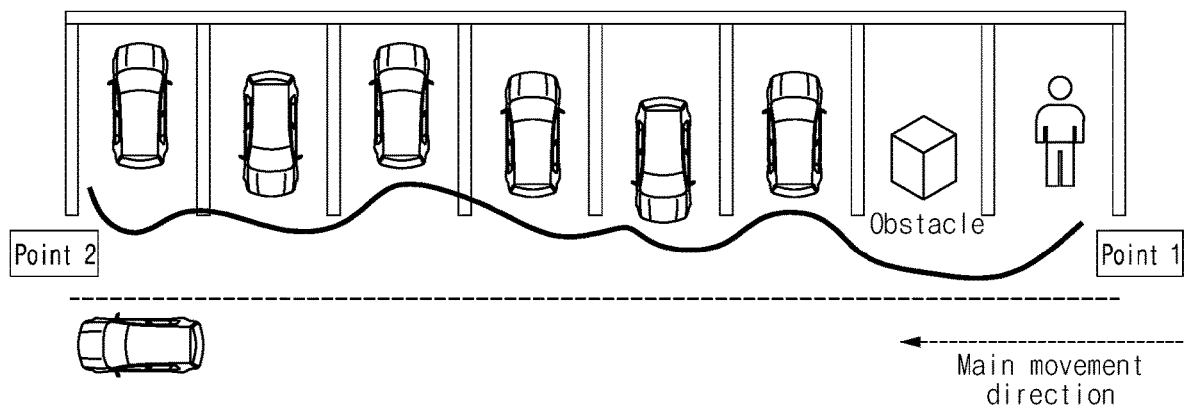
FIGS. 8A and 8B illustrate views for describing an example of moving a double-parked host vehicle to take out of an existing parked vehicle after double-parking according to an exemplary embodiment of the present disclosure.
Figure 8B:
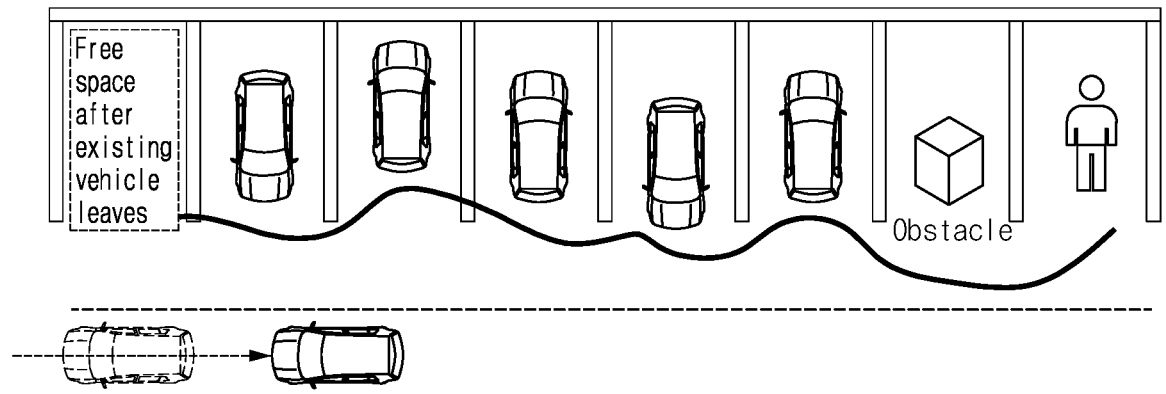

FIGS. 8A and 8B illustrate views for describing an example of moving a double-parked host vehicle to take out of an existing parked vehicle after double-parking according to an exemplary embodiment of the present disclosure.

Referring to FIG. 8A, the processor 140 generates a target reference from point 1 to point 2 and controls the vehicle to be double-parked near point 2 based on the target reference.

Referring to FIG. 8B, when a previously parked vehicle at a position where the host vehicle is double-parked is leaving, a driver of the vehicle who wants to leave moves the double-parked host vehicle from an outside of the host vehicle to the rear by a certain distance to provide a space for leaving.

When there are previously double-parked vehicles in the parking zone, the processor 140 may search for available parking spaces between double-parked vehicles and select a large-sized parking space among the available parking spaces as a parking spot.

When double-parking in the parking zone, the processor 140 may select a parking spot in a center of the parking zone in consideration of a space capable of moving forward or backward to control double-parking.

Figure 9A:
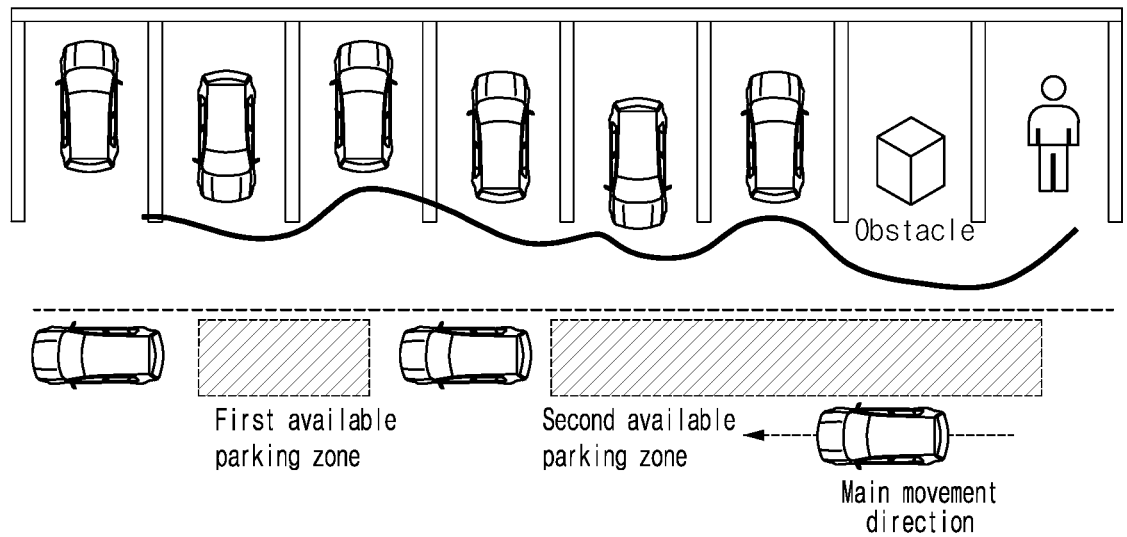
FIGS. 9A and 9B illustrate views for describing a process of selecting a parking spot that can be parked in a normal mode according to an exemplary embodiment of the present disclosure.
Figure 9B:
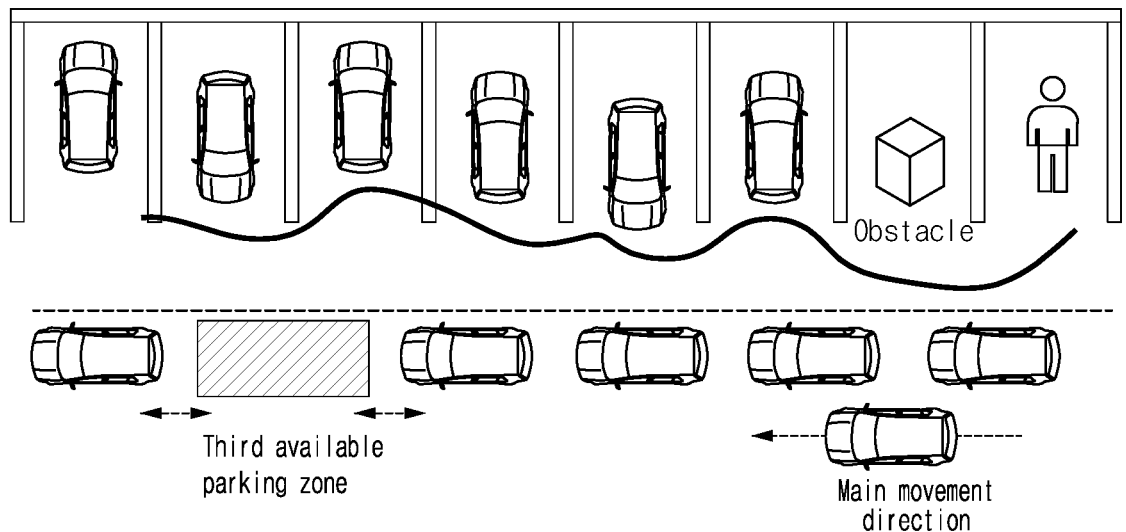
Figure 10:
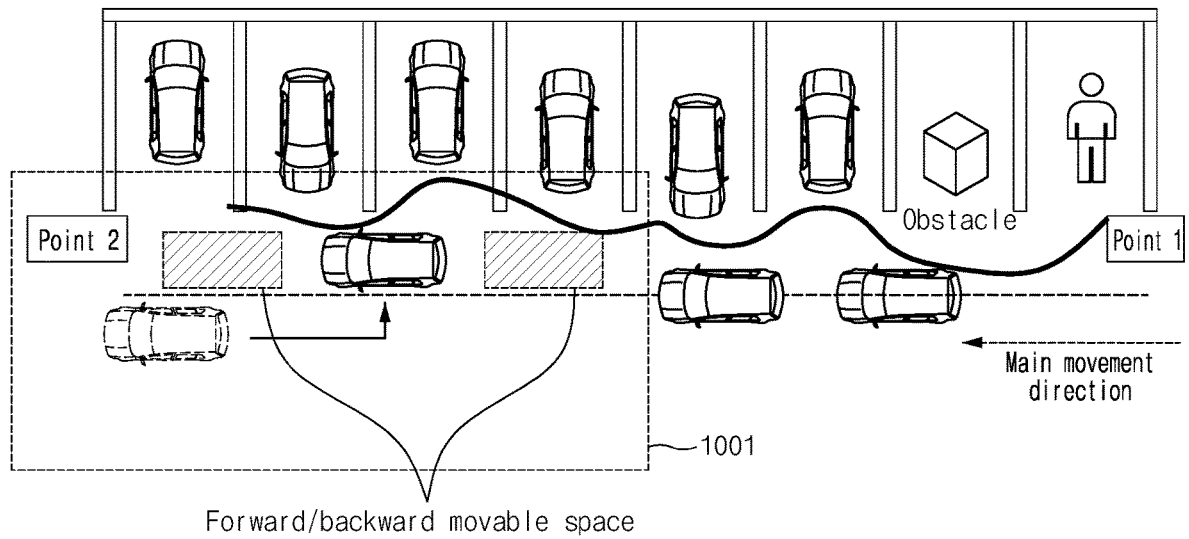
FIG. 10 illustrate a view for describing a process of selecting a parking spot that can be parked in a specific mode according to an exemplary embodiment of the present disclosure.

FIGS. 9A and 9B illustrate views for describing a process of selecting a parking spot that can be parked in a normal mode according to an exemplary embodiment of the present disclosure, and FIG. 10 illustrate a view for describing a process of selecting a parking spot that can be parked in a specific mode according to an exemplary embodiment of the present disclosure.

After generating an outline and a target reference as illustrated in FIG. 8B, the processor 140 may perform double-parking control based on the target reference, and when an existing parked vehicle leaves, the vehicle may move forward and backward by pushing it from the outside.

When a double-parked vehicle exists in double-parking zones as illustrated in FIG. 9A, the processor 140 may recognize a first available parking zone and a second available parking zone, which are available among the double-parking zones, and then may select the parking zone as the second available parking zone, which makes it to leave between the host vehicle and the existing parked vehicle.

In the case where there is a double-parked vehicle in the double-parking zones as illustrated in FIG. 9B, when only a third available parking zone is available, the processor 140 may determine a parking slot in consideration of a relationship with the existing double-parked vehicle rather than just determining physical adequacy based on a length of the parking space. In this case, the processor 140 may recognize that all vehicles may be difficult to leave because the host vehicle is double-parked, and may reserve the parking when a distance between existing parked vehicles is tight and may perform parking by securing a free space at a same interval as front and rear vehicles when a double-parking length is secured.

In the case of a specific mode situation for parking near a zone of the point 2 as illustrated in FIG. 10, the processor 140 may perform double-parking by checking a forward/backward movable space in a parking zone 1001.

The processor 140 may generate a parking trajectory for parking the host vehicle at a parking spot, may control the host vehicle depending on the parking trajectory, and may output an alarm command after completion of double-parking at the parking spot.

The processor 140 may determine a possibility of collision when moving it forward or backward after completing double-parking at the parking spot.

When there is a possibility of collision, the processor 140 may correct a position by moving the host vehicle in the longitudinal or lateral direction at the parking spot to avoid the collision.

After such position correction, the processor 140 may output a final alarm command informing that the double-parking has been completed.

The processor 140 may perform double-parking control based on one of a semi-automatic mode or a fully automatic mode selected by the user when performing the double-parking control of the host vehicle at the parking spot.

The processor 140 may receive approval related to system execution from a user before starting control, and may receive system control authority. That is, one of the semi-automatic mode and the fully automatic mode may be selected and performed by the user for parking control.

In the semi-automatic (SEMI) mode, after the user puts it into reverse for double-parking, the user may release a steering wheel and operates a brake pedal to reverse within speed limit, and the steering wheel may be automatically operated while reversing. Thereafter, when parking guidance is completed, the parking control apparatus 100 guides the user through voice and display and terminates the function.

In the fully automatic (FULL) mode, when the user presses a control switch for double-parking, the steering wheel and the brake pedal are automatically operated until parking is completed. After the parking guidance is completed, situation notification may be performed in a same manner as in the semi-automatic mode.

The alarm device 150 may output an alarm when receiving an alarm command from the processor 140. In this case, the alarm may be performed by at least one of visual, auditory, or tactile sense.

The sensing device 200 may sense an obstacle (e.g., a previously parked vehicle, a vehicle moving through a parking lot, etc.), a free parking space, a parking guide line (parking dividing line), a double-parking guide line, etc. by searching for a parking space.

To this end, the sensing device 200 may include a camera 210, an ultrasonic wave sensor 220, and the like, the camera 201 is mounted in the front as illustrated in FIG. 2, and a plurality of ultrasonic sensors 220 may be provided in the front and rear.

The camera 210 detects information such as a parking guide line, a double-parking guide line, a free parking space, and a previously parked vehicle, and the ultrasonic sensor 220 may search for a parking space.

The steering control device 300 may be configured to control a steering angle of a vehicle, and may include a steering wheel, an actuator interlocked with the steering wheel, and a controller controlling the actuator. In this case, the steering control device 300 may be implemented as a motor driven power steering (MDPS) 301 of FIG. 2.

The braking control device 400 may be configured to control braking of the vehicle, and may include a controller that controls a brake thereof.

The engine control device 500 may be configured to control engine driving of a vehicle, and may include a controller that controls a speed of the vehicle.

As such, the present disclosure uses the pre-mounted camera 210 and the ultrasonic wave sensor 220 to search for the parking space and supports double-parking control when there is no free parking space.

FIGS. 11A to 11N illustrate an example of a screen for each operation during parking control according to an exemplary embodiment of the present disclosure, which may be displayed through the display device 130. In addition, the examples of the screen illustrated in FIGS. 11A to 11N may be displayed through a screen such as a head-up display (HUD) of a vehicle, a cluster, an audio video navigation (AVN), a human machine interface (HMI), and a user select menu (USM).

Figure 11B:
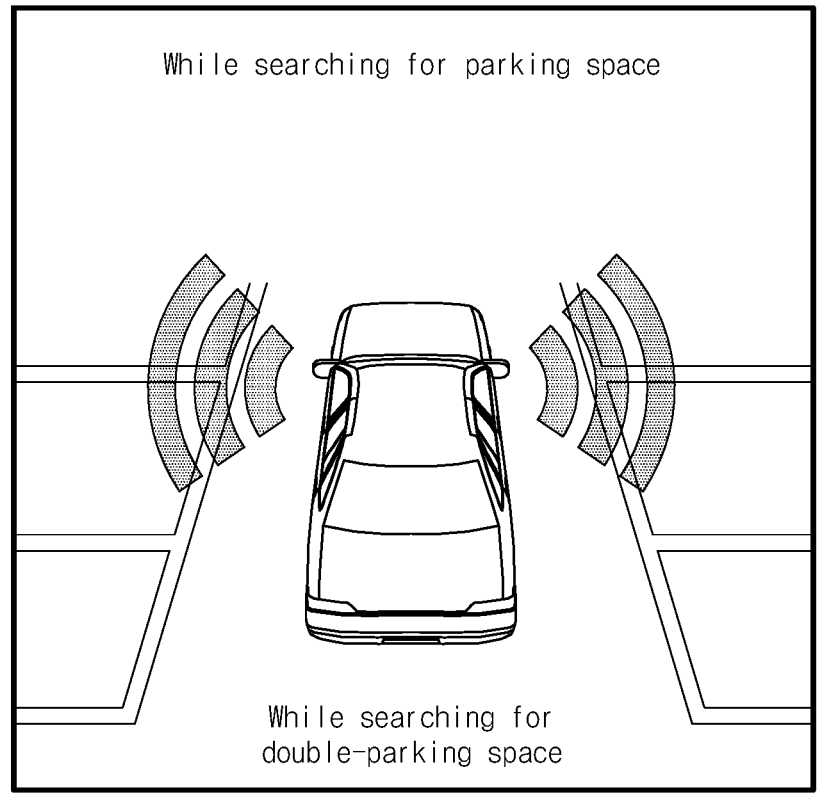
Figure 11C:
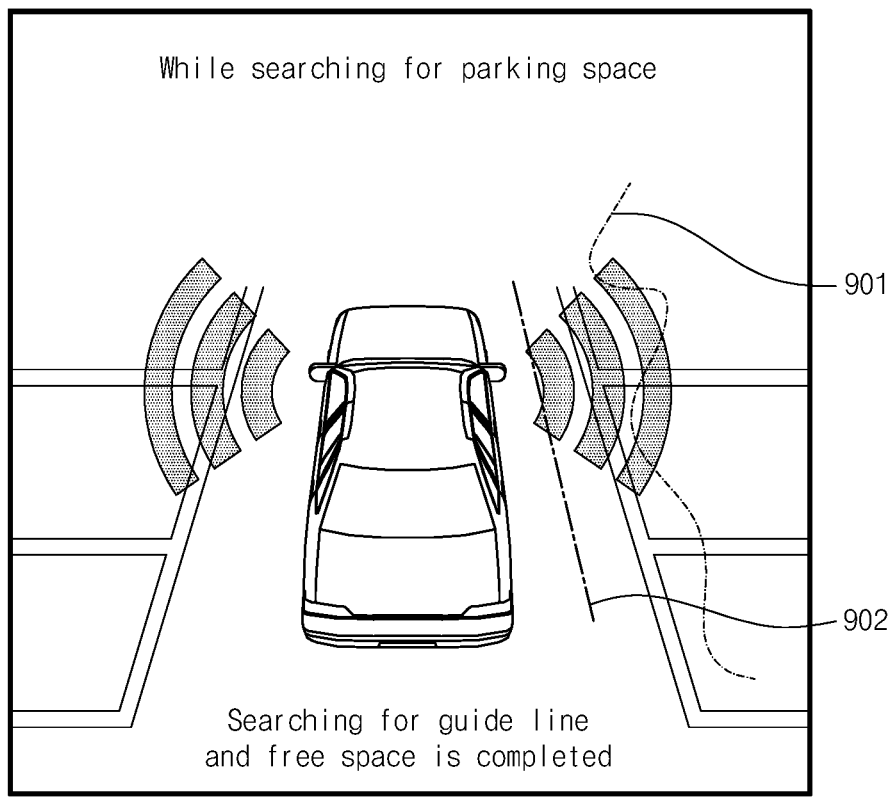
Figure 11D:
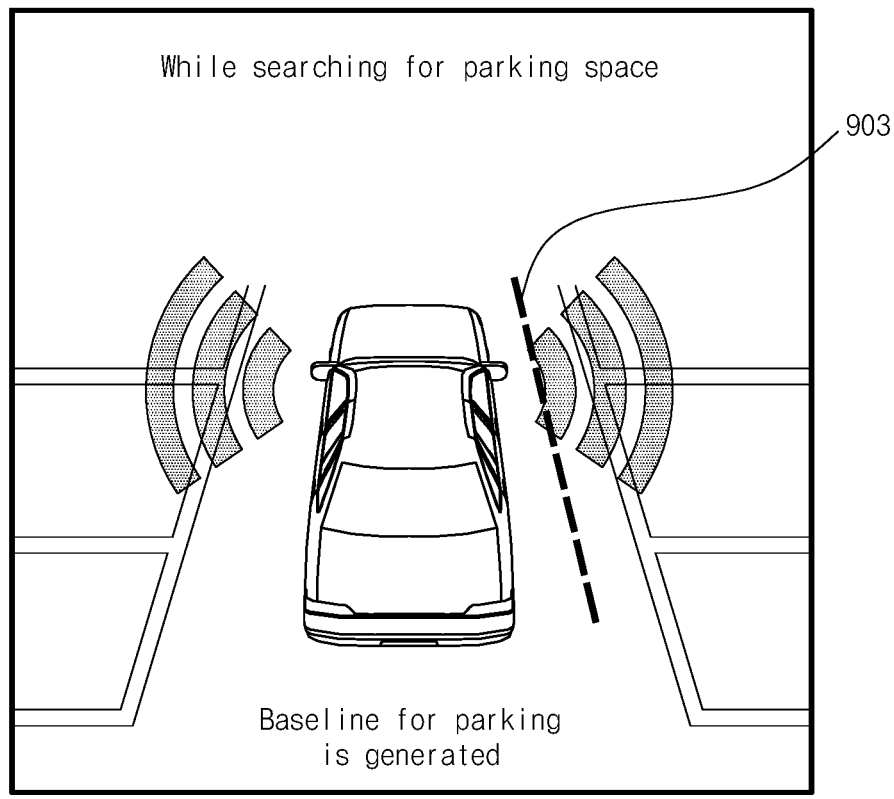
Figure 11E:
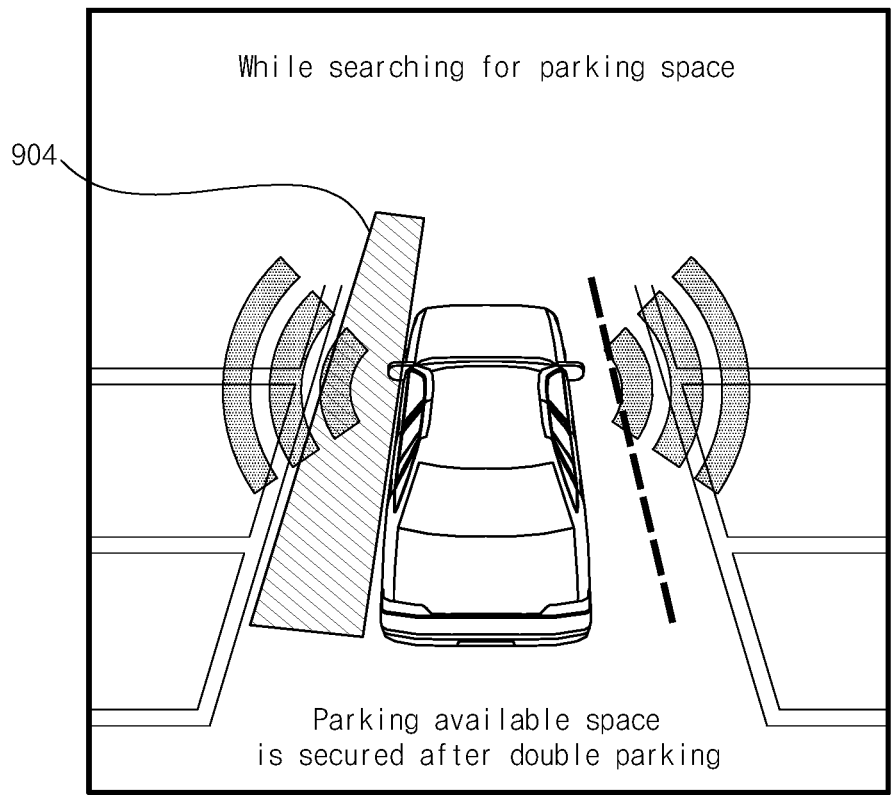
Figure 11F:
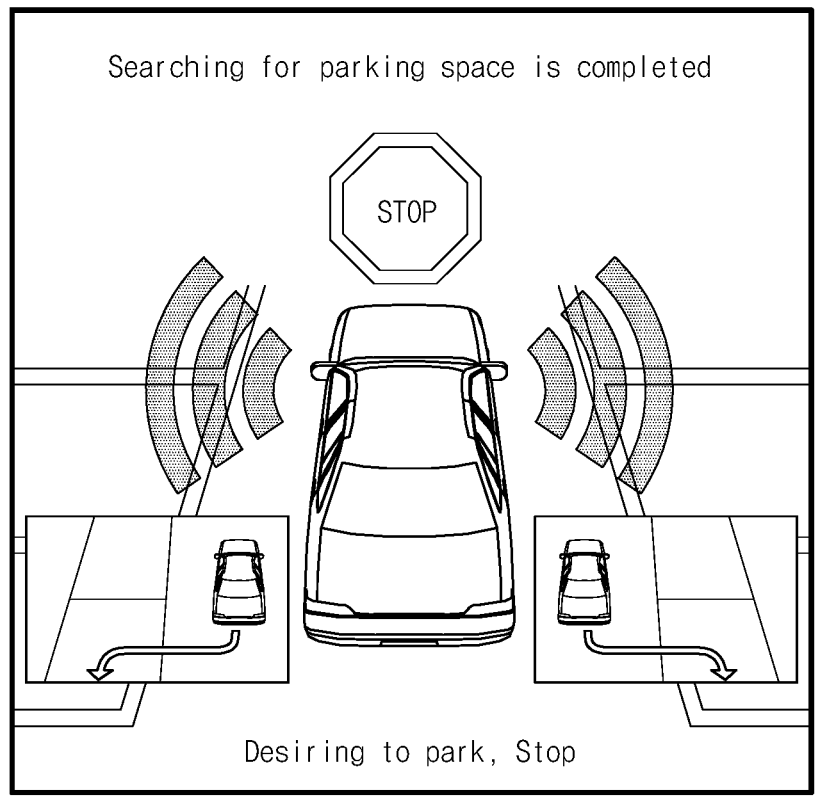

FIG. 11A illustrates an example of a screen of a state in which a double-parking control mode is turned on, and FIG. 11B illustrates an example of a screen when searching for a parking space. FIG. 11C illustrates an example of a screen in which parking guide line 901 and outline 902 are detected, and FIG. 11D illustrates an example of a screen in which a target reference 903 for double-parking control was generated. FIG. 11E illustrates an example of a screen indicating that a driving path 904 for other driving vehicles has been secured after double-parking based on the target reference 903 for double-parking, and FIG. 11F illustrates an example of a screen for selecting a parking spot.

Figure 11G:
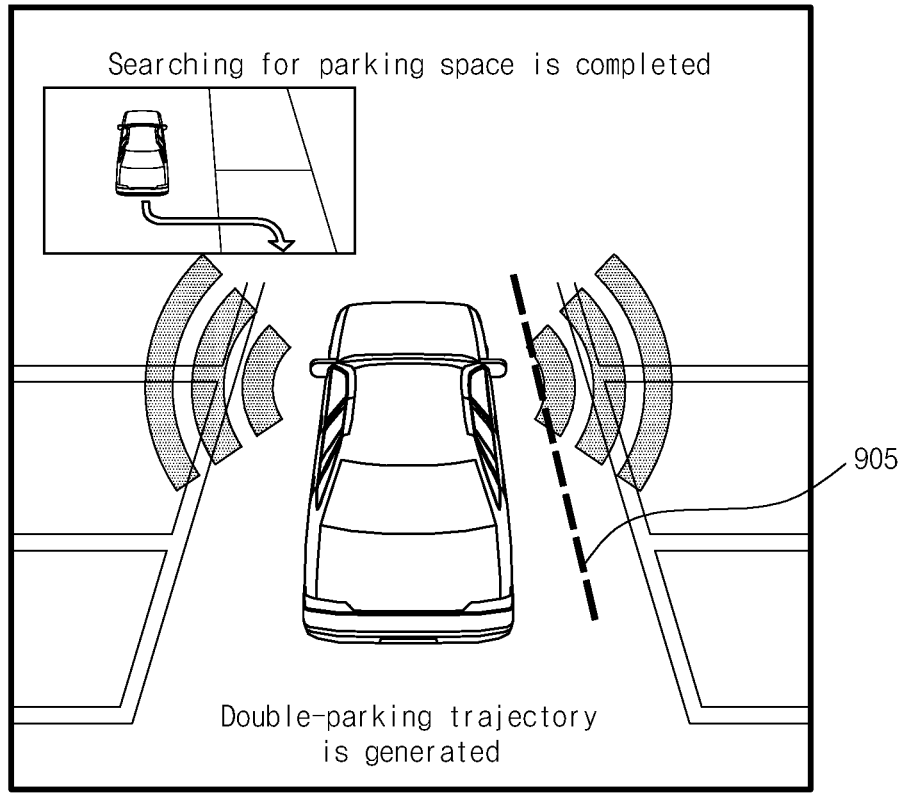
Figure 11H:
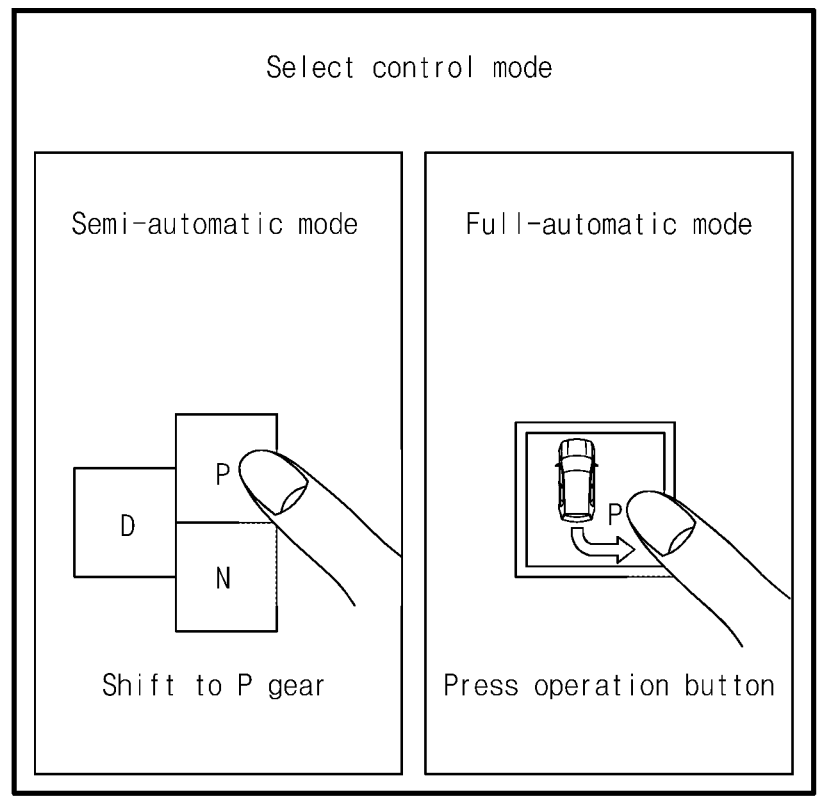
Figure 11I:
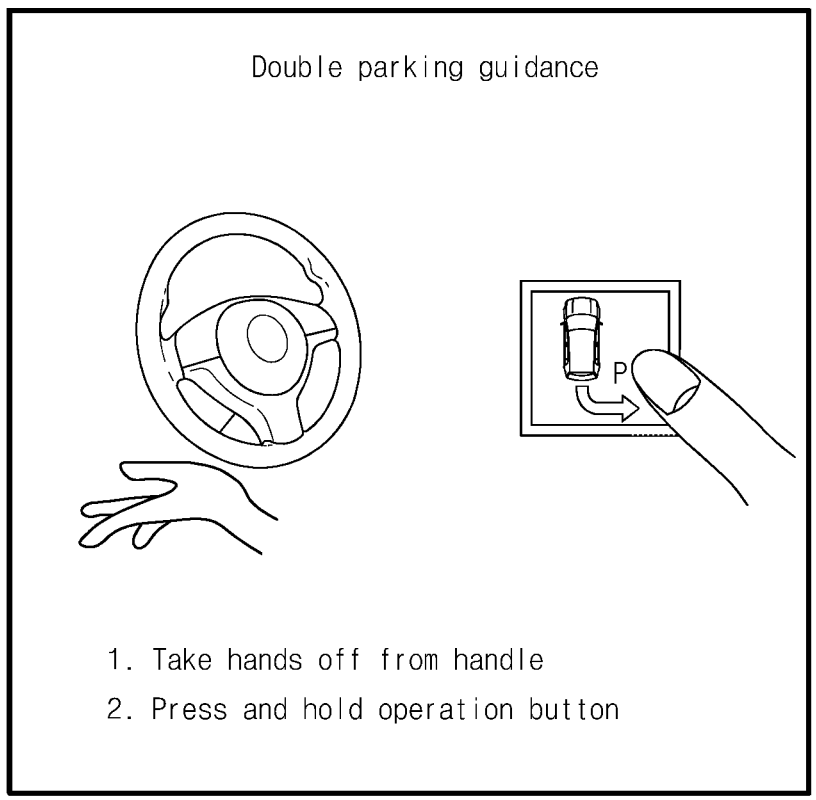
Figure 11J:
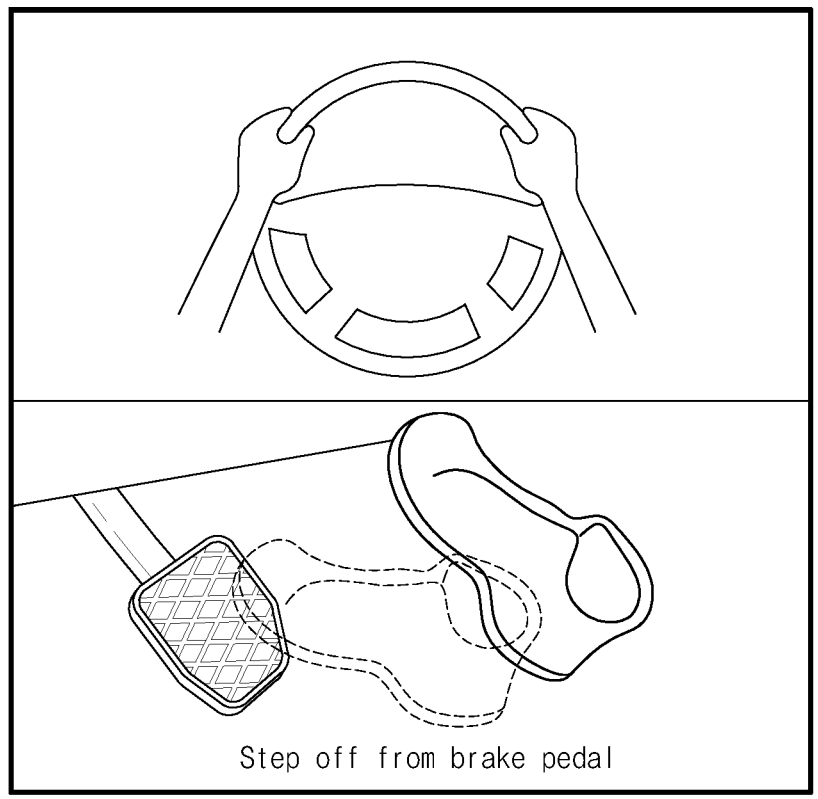

FIG. 11G illustrates an example of a screen in which a double-parking trajectory has been generated, FIG. 11H illustrates a screen for a user to select the semi-automatic mode or the fully automatic mode, FIG. 11I and FIG. 11J respectively illustrate a screen for inducing a user to release his or her hand from the steering wheel when the semi-automatic mode or the fully automatic mode is selected, and a screen for inducing the user to release his or her foot from the brake pedal.

Figure 11K:
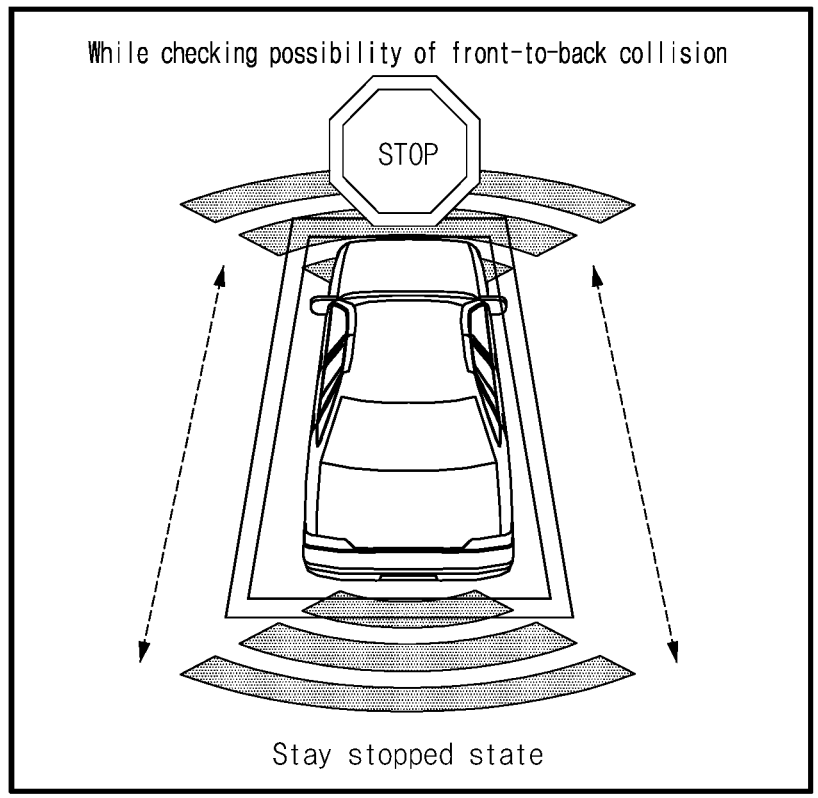
Figure 11L:
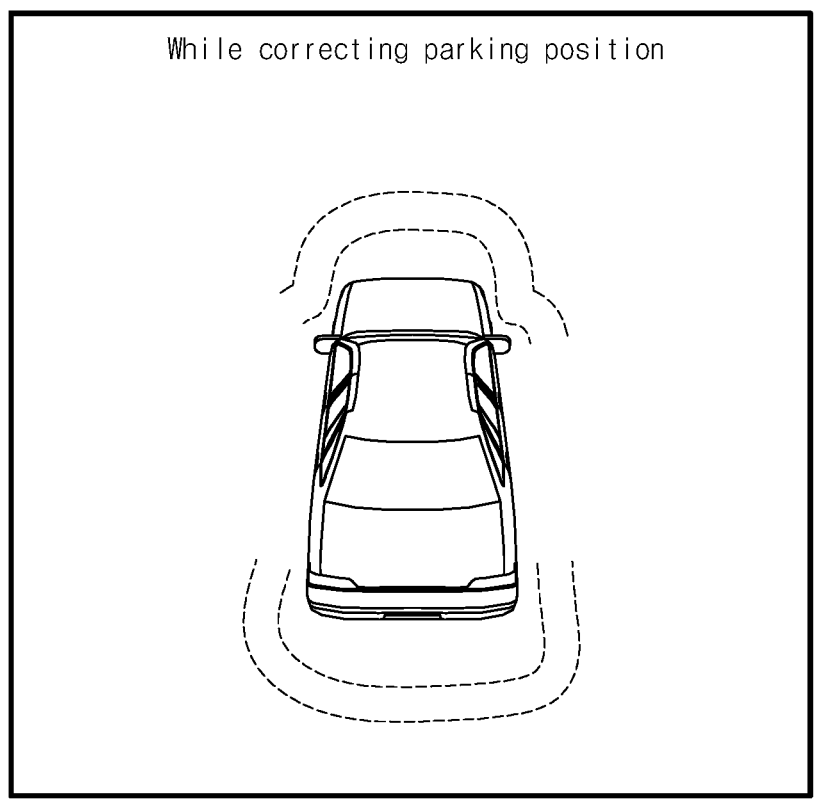

FIG. 11K illustrates an example of a screen showing a process of determining whether there is room for collision in a double-parked state after a first completion of double-parking, and FIG. 11L illustrates an example of a screen while correcting a current parking position because a collision is expected to occur.

Figure 11M:
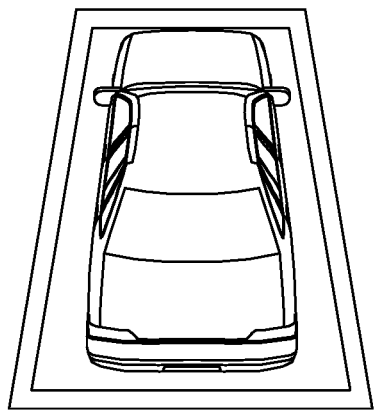
Figure 11N:
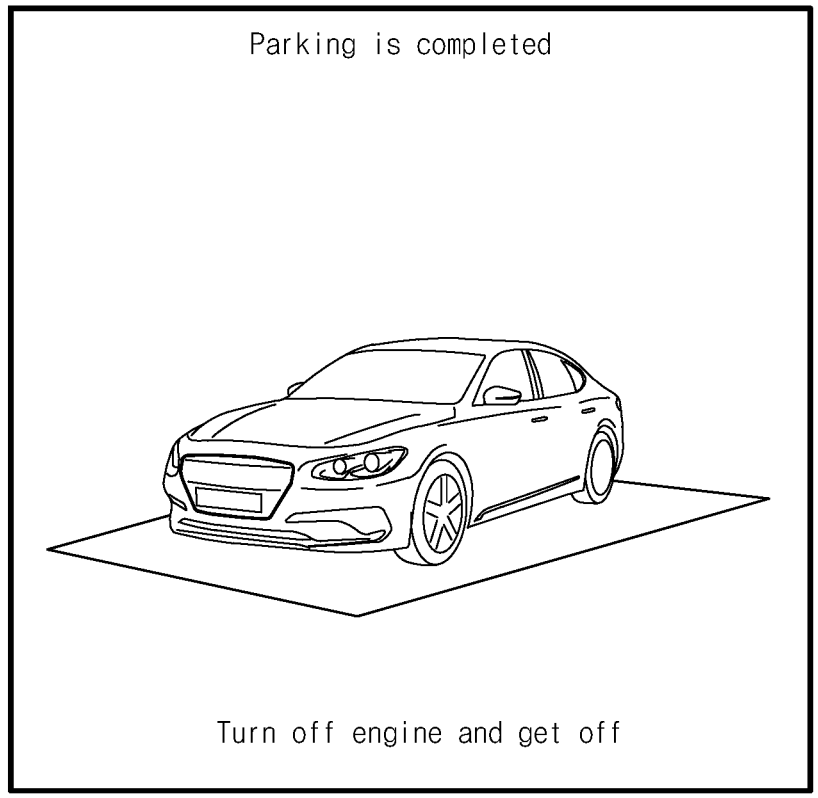

FIG. 11M and FIG. 11N illustrate examples of an alarm screen upon completion of double-parking.

Figure 12:
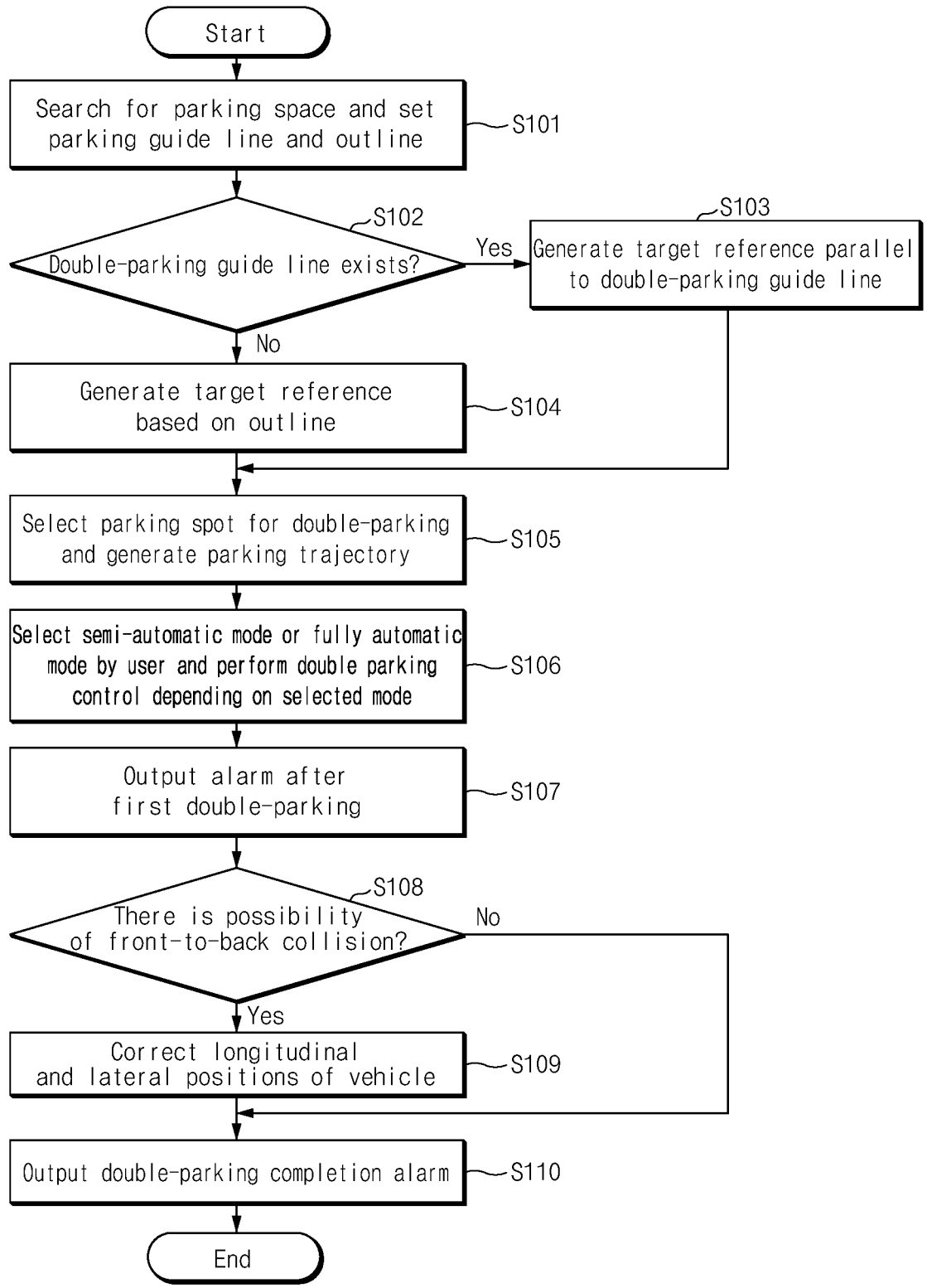
FIG. 12 illustrates a parking control method according to an exemplary embodiment of the present disclosure.

Hereinafter, a parking control method according to an exemplary embodiment of the present disclosure will be described in detail with reference to FIG. 12. FIG. 12 illustrates a parking control method according to an exemplary embodiment of the present disclosure.

Hereinafter, it is assumed that the parking control apparatus 100 of FIG. 1 performs processes of FIG. 12. In addition, in the description of FIG. 12, operations described as being performed by a device may be understood as being controlled by the processor 140 of the parking control apparatus 100.

Referring to FIG. 12, the parking control apparatus 100 may search for a parking space, and may a parking guide line and an outline (S101). In this case, the parking guide line indicates a parking division line of a parking lot, and the outline indicates an outline of an obstacle, such as the obstacle 601 of FIG. 6B and the obstacle 712 of FIG. 7B.

The parking control apparatus 100 determines whether a double-parking guide line exists (S102).

The parking control apparatus 100 generates a target reference (target reference line) that is parallel to the double-parking guide line when the double-parking guide line exists (S103).

When there is no double-parking guide line, the parking control apparatus 100 generates a target reference based on the outline (S104).

The parking control apparatus 100 selects a parking spot for double-parking and generates a parking trajectory (S105).

One of a semi-automatic mode and a fully automatic mode is selected by a user, and double-parking control is performed depending on the selected control mode (S106).

The parking control apparatus 100 outputs an alarm after completing a first double-parking (S107), and may virtually determine whether there is a possibility of front-to-back collision (S108) in the case of moving the host vehicle by applying a force from outside a vehicle to exit a previously parked vehicle from a current parking position.

When there is a possibility of collision, the parking control apparatus 100 corrects longitudinal and lateral positions of the vehicle (S109).

The parking control apparatus 100 outputs a double-parking final alarm (S110). As such, according to the present disclosure, user's convenience may be increased by applying a parking assist technique to a double-parking situation, and function implementation is possible without adding parts by using a camera and an ultrasonic sensor applied to an existing parking assistance technique as they are.

Figure 13:
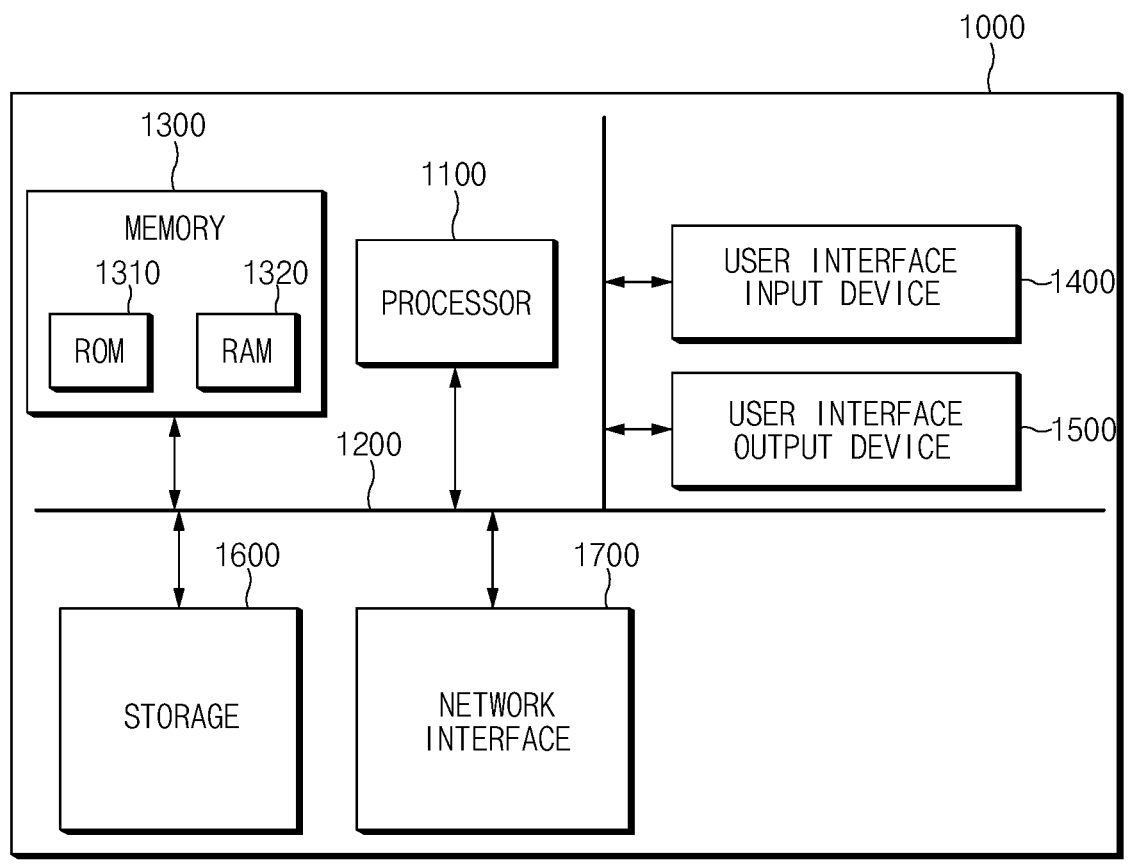
FIG. 13 illustrates a computing system according to an exemplary embodiment of the present disclosure.

FIG. 13 illustrates a computing system according to an exemplary embodiment of the present disclosure.

Referring to FIG. 13, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A parking control apparatus comprising:
    a processor configured to:
        generate an outline based on previously parked vehicles,
        generate a target reference based on the outline,
        select a parking spot for double-parking based on the target reference, and
        perform double-parking control on the parking spot when there are no vacant parking spaces by searching for at least a parking space in a parking lot; and
    a storage configured to store data and algorithms driven by the processor;
    wherein the processor, when a double-parking guide line is detected in searching for the parking space, generates the target reference between the double-parking guide line and the outline, and generates the target reference parallel to the double-parking guide line.

2. The parking control apparatus of claim 1, wherein the processor, when no double-parking guide line is detected in searching for the parking space, generates the target reference to be parallel to a parking dividing line in a longitudinal direction by separating it by a predetermined distance from a point that is closest to a driving passage in the outline.

3. The parking control apparatus of claim 1, wherein the processor generates a parking zone by using at least one of a size of a double-parking place, a traffic situation, or a traffic lane width after parking.

4. The parking control apparatus of claim 3, wherein the processor divides the parking zone into a general mode in which an entire size of the double-parking place is set as the parking zone and a specific mode in which a portion of the double-parking place is set as the parking zone.

5. The parking control apparatus of claim 4, wherein the processor induces the general mode to be set when the size of the double-parking place is larger than a predetermined size, a number of vehicles passing is smaller than a predetermined number, or the traffic lane width is wider than a predetermined width after parking.

6. The parking control apparatus of claim 5, wherein the processor controls a host vehicle to be double-parked at a side of an aisle in which other vehicles travel based on the target reference in the general mode.

7. The parking control apparatus of claim 4, wherein the processor induces the general mode to be set when the size of the double-parking place is smaller than a predetermined size, a number of vehicles passing is greater than a predetermined number, or the traffic lane width is narrower than a predetermined width after parking.

8. The parking control apparatus of claim 4, wherein the processor controls double-parking based on the target reference, and controls a vehicle to double-park between the target reference and the outline in the specific mode.

9. The parking control apparatus of claim 4, wherein the processor suggests one of the general mode or the specific mode to a user, and allow the user to select one of the modes by using at least one of a size of a double-parking place, a traffic situation, or a traffic lane width after parking.

10. The parking control apparatus of claim 3, wherein the processor controls the vehicle to be double-parked in an innermost side of the parking zone based on a movement direction of a host vehicle when there is no previously double-parked vehicle in the parking zone.

11. The parking control apparatus of claim 3, wherein the processor, when there are previously double-parked vehicles in the parking zone, searches for available parking spaces between the previously double-parked vehicles, and selects a parking space that is larger than a predetermined size among the available parking spaces as the parking spot.

12. The parking control apparatus of claim 3, wherein the processor, when double-parking in the parking zone, selects the parking spot in a center of the parking zone in consideration of a space capable of moving forward or backward to control double-parking.

13. The parking control apparatus of claim 1, wherein the processor generates a parking trajectory for parking a host vehicle at the parking spot, controls the host vehicle depending on the parking trajectory, and outputs an alarm command after completion of double-parking at the parking spot.

14. The parking control apparatus of claim 12, wherein the processor determines a possibility of collision when moving it forward or backward after completing double-parking at the parking spot.

15. The parking control apparatus of claim 14, wherein the processor, when there is a possibility of collision, corrects a position by moving the host vehicle in the longitudinal or lateral direction at the parking spot to avoid the collision.

16. The parking control apparatus of claim 15, wherein the processor, after correction of the position, outputs a final alarm command informing that the double-parking has been completed.

17. The parking control apparatus of claim 1, wherein the processor, when performing the double-parking control of a host vehicle at the parking spot, performs double-parking control based on one of a semi-automatic mode or a fully automatic mode selected by a user.

18. A parking control method comprising:
- searching, by a processor, for a parking space in a parking lot;
- generating, by the processor, an outline based on previously parked vehicles when there is no free parking space;
- generating, by the processor, a target reference based on the outline;
- selecting, by the processor, a parking spot for double-parking based on the target reference; and
- performing, by the processor, double-parking control on the parking spot;

wherein generating the target reference includes generating the target reference between the double-parking guide line and the outline, and generating the target reference parallel to the double-parking guide line when a double-parking guide line is detected in searching for the parking space.

19. The parking control method of claim 18, wherein generating the target reference the further includes
- generating a target reference to be parallel to a parking dividing line in a longitudinal direction by separating it by a predetermined distance from a point that is closest to a driving passage in the outline when no double-parking guide line is detected in searching for the parking space.

* * * * *